(12) United States Patent
Hashimura et al.

(10) Patent No.: US 6,922,289 B2
(45) Date of Patent: Jul. 26, 2005

(54) OBJECTIVE LENS SYSTEM FOR OPTICAL PICKUPS

(75) Inventors: Junji Hashimura, Sakai (JP); Kyu Takada, Otsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/438,135

(22) Filed: May 14, 2003

(65) Prior Publication Data

US 2003/0218804 A1 Nov. 27, 2003

(30) Foreign Application Priority Data

May 17, 2002 (JP) ........................................ 2002-143373

(51) Int. Cl.$^7$ .......................... G02B 21/02; G02B 13/18
(52) U.S. Cl. ....................... 359/661; 359/662; 359/664; 359/718; 359/719; 369/112.01; 369/112.23
(58) Field of Search ................................ 359/718–719, 359/661, 662, 664; 369/112.01, 112.23

(56) References Cited

U.S. PATENT DOCUMENTS

| | | | | |
|---|---|---|---|---|
| 4,613,212 A | * | 9/1986 | Norikazu ..................... 359/719 |
| 4,655,556 A | * | 4/1987 | Kajitani ....................... 359/719 |
| 4,729,645 A | * | 3/1988 | Suda ............................ 359/719 |
| 4,828,373 A | * | 5/1989 | Suda et al. .................. 359/718 |
| 4,842,388 A | | 6/1989 | Tanaka et al. ............... 350/432 |
| 6,014,271 A | * | 1/2000 | Uchida et al. ............... 359/719 |
| 6,147,956 A | * | 11/2000 | Jutte et al. .............. 369/112.23 |
| 6,411,442 B1 | | 6/2002 | Ota et al. .................... 359/642 |
| 6,512,640 B2 | | 1/2003 | Ota et al. .................... 359/719 |
| 6,597,519 B2 | * | 7/2003 | Saito ........................... 359/719 |
| 6,744,568 B2 | * | 6/2004 | Kitamura et al. ........... 359/719 |
| 6,785,215 B2 | * | 8/2004 | Yamanouchi et al. .. 369/112.23 |
| 6,819,504 B2 | * | 11/2004 | Maruyama ................... 359/719 |
| 6,822,800 B2 | * | 11/2004 | Koreeda et al. ............ 359/719 |
| 2002/0097661 A1 | * | 7/2002 | Itonaga et al. ......... 369/112.23 |
| 2004/0246877 A1 | * | 12/2004 | Ishizaki et al. ........ 369/112.23 |
| 2004/0257673 A1 | * | 12/2004 | Sugi et al ................... 359/719 |
| 2004/0257959 A1 | * | 12/2004 | Arai et al .............. 369/112.23 |

FOREIGN PATENT DOCUMENTS

| | | | | | |
|---|---|---|---|---|---|
| JP | 60181714 A | * | 9/1985 | ........... G02B/13/00 |
| JP | 61056314 A | * | 3/1986 | ........... G02B/13/18 |
| JP | 61177409 A | * | 8/1986 | ........... G02B/13/00 |
| JP | 01177006 A | * | 7/1989 | ........... G02B/13/18 |
| JP | 05-039447 B2 | | 6/1993 | |
| JP | 2001-297471 A | | 10/2001 | |

* cited by examiner

*Primary Examiner*—Evelyn A. Lester
(74) *Attorney, Agent, or Firm*—Sidley Austin Brown & Wood LLP

(57) ABSTRACT

An objective lens system for optical pickups reading and/or writing information by condensing a luminous flux from a light source onto an optical information recording medium, consists of, a single lens having, from a light source side, a first surface convex to the light source side and a second surface convex to an image side. A medium of the single lens is a homogeneous medium. At least one of the two surfaces is aspherical. The system satisfies the predetermined conditions.

44 Claims, 14 Drawing Sheets

OBJECTIVE LENS SYSTEM FOR OPTICAL PICKUPS

RELATED APPLICATION

This application is based on application No. 2002-143373 filed in Japan on May 17, 2002, the content of which is hereby incorporated by reference.

FIELD OF THE INVENTION

The present invention relates to an objective lens system for optical pickups, for example, to an objective lens system for optical pickups having a high numerical aperture (NA) and mounted on optical information recorders, magneto-optic recorders and the like.

DESCRIPTION OF THE PRIOR ART

Various types of objective lens systems for optical pickups for reading and/or writing information from and onto optical information recording media (e.g. optical disks) have been proposed (e.g. Japanese Examined Published Patent Application No. 05-39447 and U.S. Pat. Nos. 6,411,442 and 6,512,640.

However, in order for conventional objective lens systems for optical pickups to cope with the increase in numerical aperture achieved by a blue laser, it is necessary to secure a working distance for preventing collision with the optical disk substrate. In addition, it is necessary to secure off-axial performance capable of coping with three-beam tracking control and the like. Although the working distance can be secured by increasing the focal length of the objective lens system, in that case, it is necessary to increase the beam diameter and the lens diameter to achieve a higher numerical aperture.

SUMMARY OF THE INVENTION

An object of the present invention is to provide an improved objective lens system for optical pickups.

Another object of the present invention is to provide an objective lens system for optical pickups having achieved size reduction and a higher numerical aperture while securing the working distance and the off-axial performance.

The above-mentioned objects are attained by an objective lens system for optical pickups according to a first implementation of the present invention, having the following structure:

An objective lens system for optical pickups reading and/or writing information by condensing a luminous flux from a light source onto an optical information recording medium, wherein the objective lens system is a single lens having, from a light source side, a first surface convex to the light source side and a second surface convex to an image side, the lens medium is a homogeneous medium, the object distance is infinity, at least one of the two surfaces is aspherical, and the following conditions (1A) and (2A) are satisfied:

$$-0.45 < r1/r2 < 0.0 \quad (1A)$$

$$1.05 < d/f < 1.4 \quad (2A)$$

where r1 is the radius of curvature of the first surface;
r2 is the radius of curvature of the second surface;
d is the axial thickness of the single lens; and
f is the focal length of the single lens.

The above-mentioned objects are attained by an objective lens system for optical pickups according to a second implementation of the present invention, having the following structure:

An objective lens system for optical pickups reading and/or writing information by condensing a luminous flux from a light source onto an optical information recording medium, wherein the objective lens system is a single lens having, from a light source side, a first surface convex to the light source side and a second surface convex to an image side, the lens medium is homogeneous, at least one of the two surfaces is aspherical, and the following conditions (1B) and (2B) are satisfied:

$$-0.35 < r1/r2 < 0.0 \quad (1B)$$

$$1.05 < d/f < 1.35 \quad (2B)$$

where
r1 is the radius of curvature of the first surface;
r2 is the radius of curvature of the second surface;
d is the axial thickness of the single lens; and
f is the focal length of the single lens.

The above-mentioned objects are attained by an objective lens system for optical pickups according to a third implementation of the present invention, having the following structure:

An objective lens system for optical pickups reading and/or writing information by condensing a luminous flux from a light source onto an optical information recording medium, wherein the objective lens system is a single lens having, from a light source side, a first surface convex to the light source side and a second surface convex to an image side, the lens medium is homogeneous, at least one of the two surfaces is aspherical, and the following conditions (1B) and (2B) are satisfied:

$$-0.15 < r1/r2 < 0.0 \quad (1C)$$

$$1.05 < d/f < 1.4 \quad (2A)$$

where
r1 is the radius of curvature of the first surface;
r2 is the radius of curvature of the second surface;
d is the axial thickness of the single lens; and
f is the focal length of the single lens.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
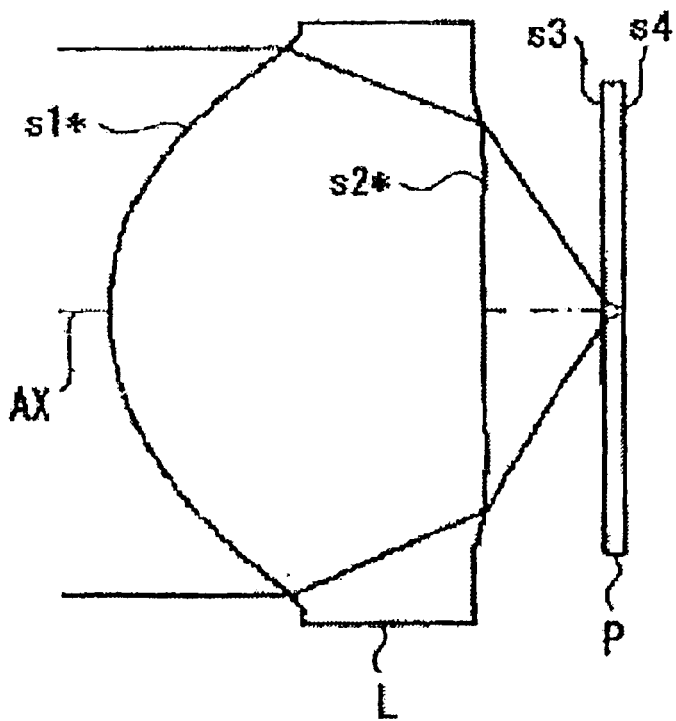
FIG. 1 is a lens arrangement view of a first embodiment.
Figure 2:
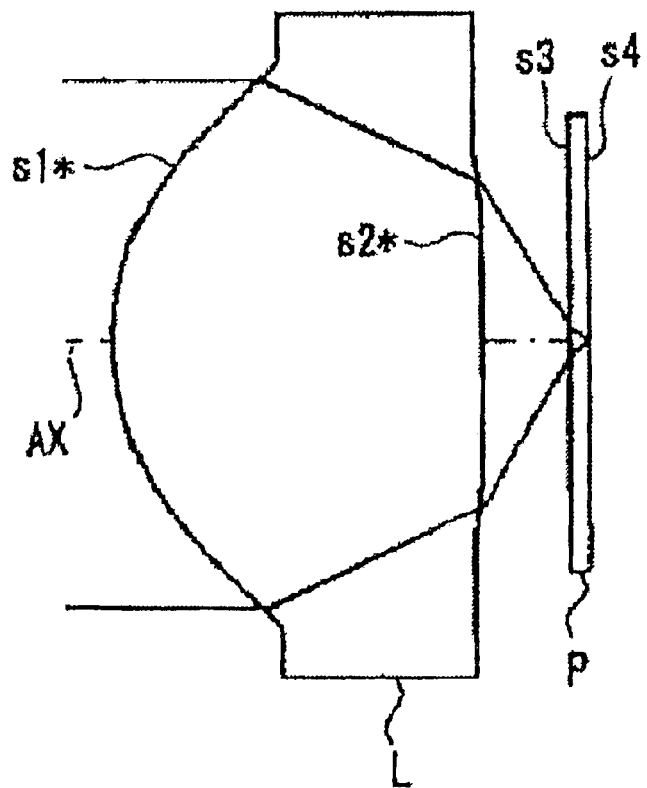
FIG. 2 is a lens arrangement view of a second embodiment.
Figure 3:
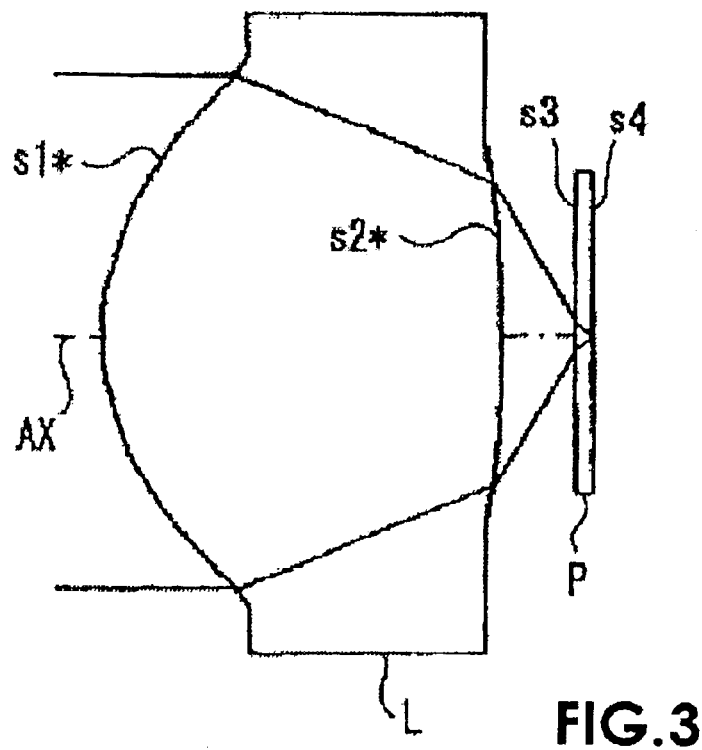
FIG. 3 is a lens arrangement view of a third embodiment.
Figure 4:
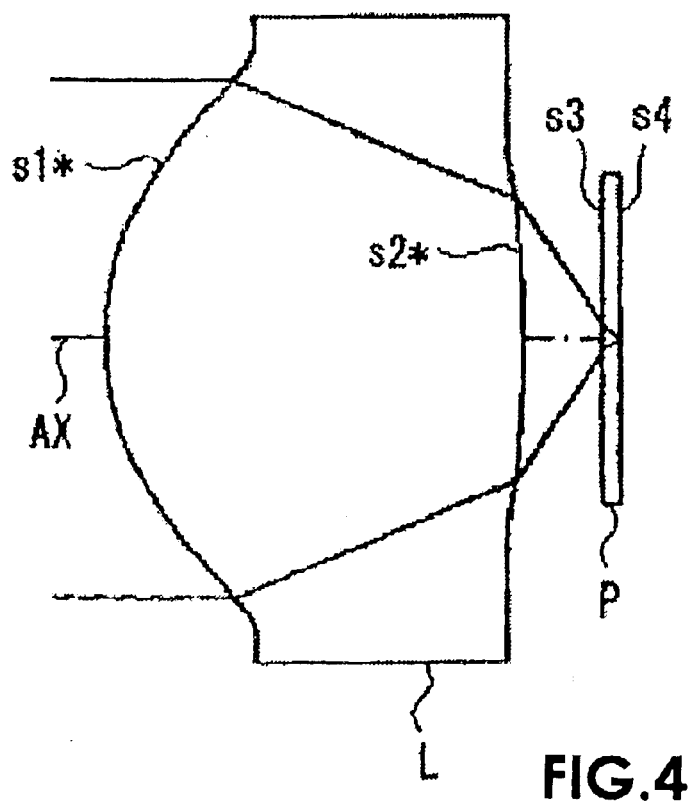
FIG. 4 is a lens arrangement view of a fourth embodiment.
Figure 5:
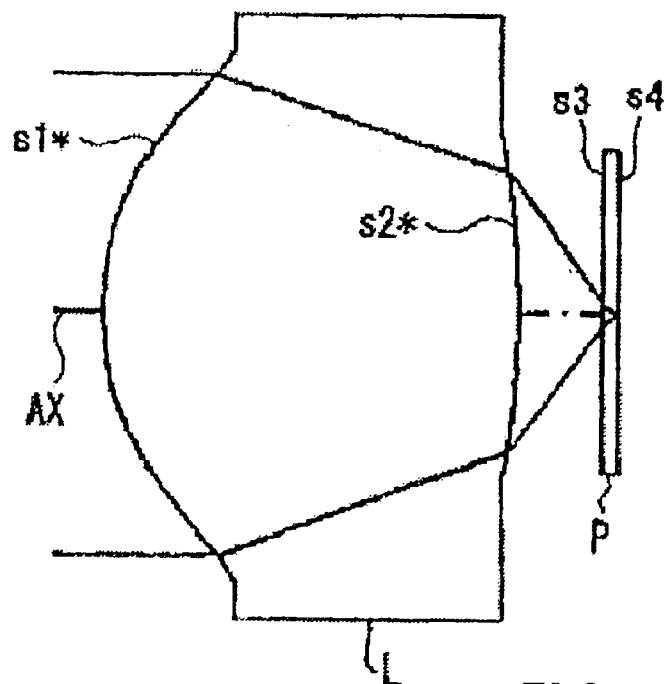
FIG. 5 is a lens arrangement view of a fifth embodiment.
Figure 6:
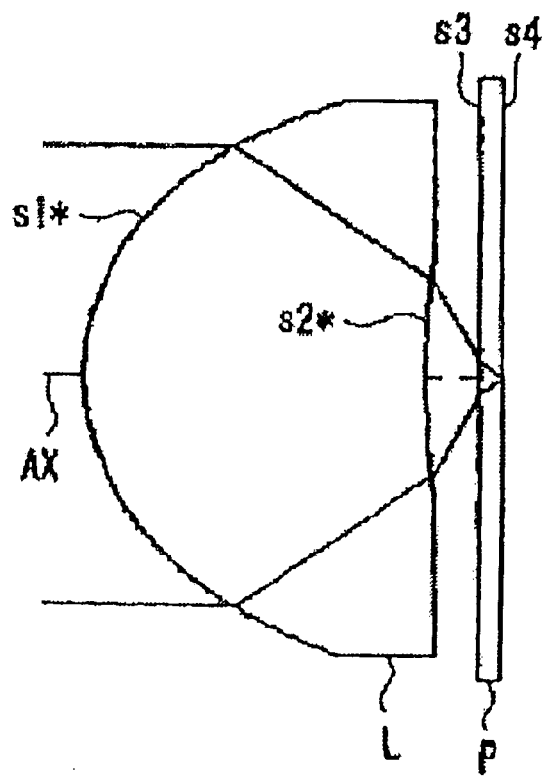
FIG. 6 is a lens arrangement view of a sixth embodiment.
Figure 7:
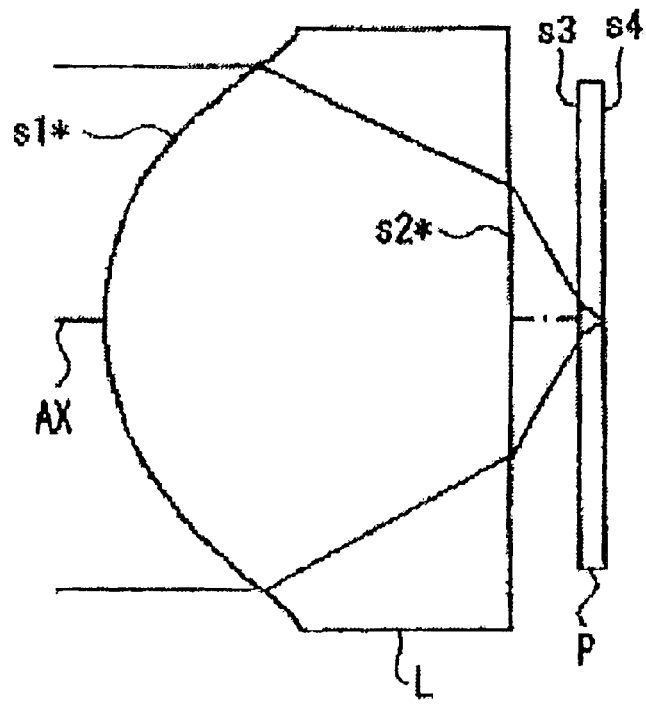
FIG. 7 is a lens arrangement view of a seventh embodiment.
Figure 8:
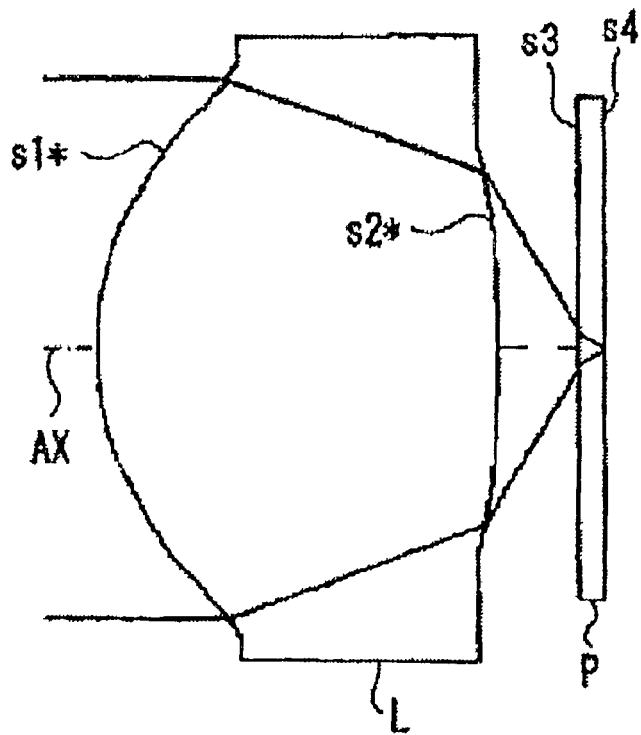
FIG. 8 is a lens arrangement view of an eighth embodiment.
Figure 9:
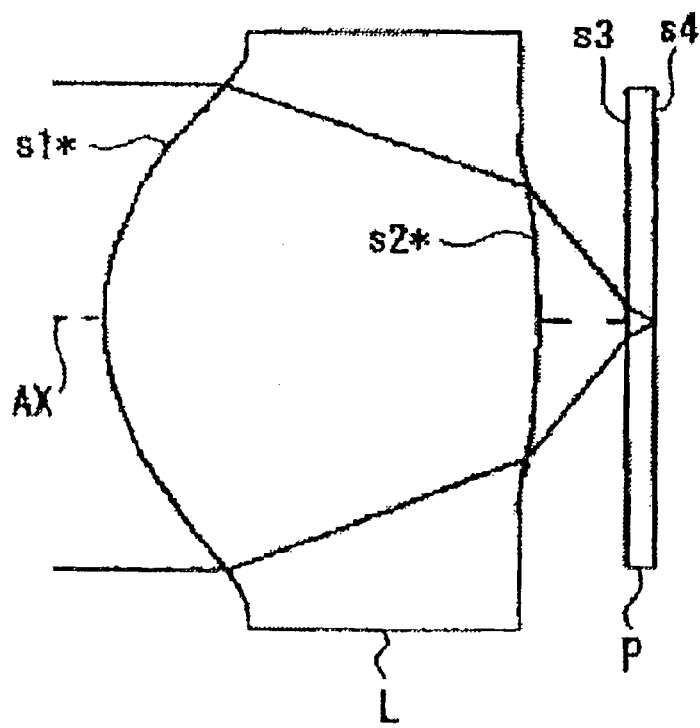
FIG. 9 is a lens arrangement view of a ninth embodiment.
Figure 10:
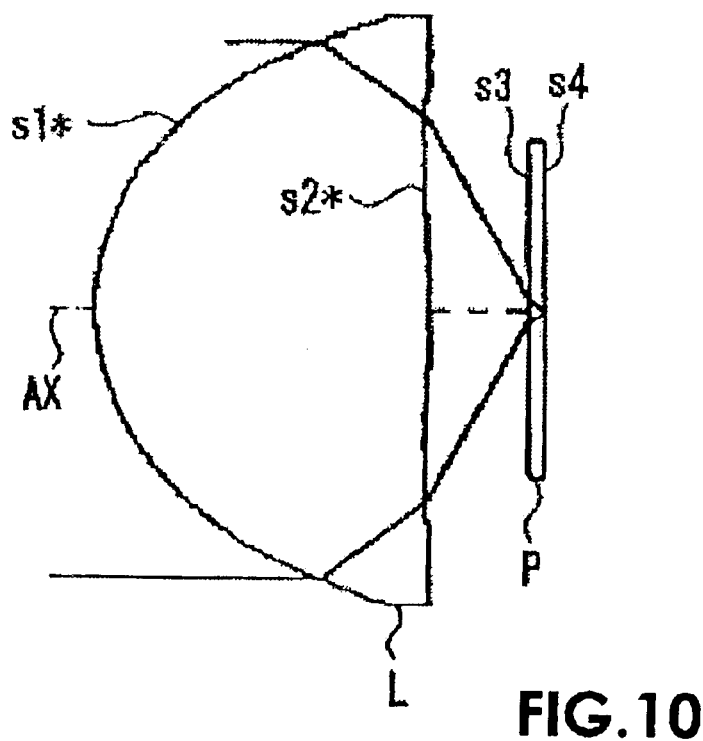
FIG. 10 is a lens arrangement view of a tenth embodiment.
Figure 11:
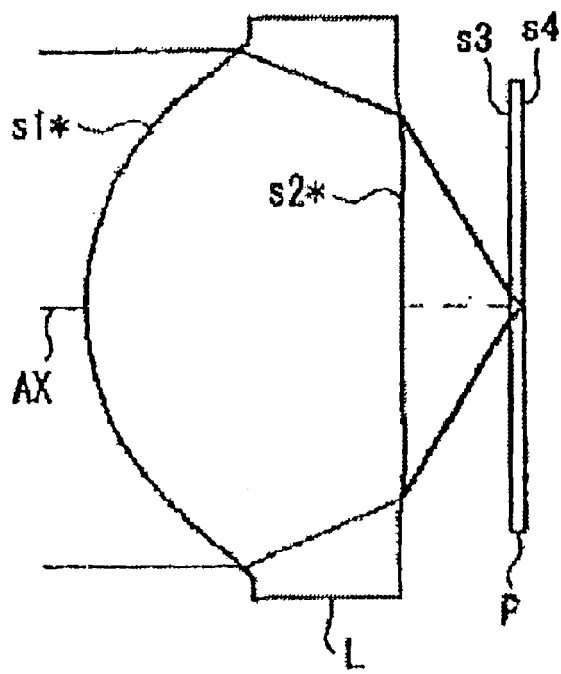
FIG. 11 is a lens arrangement view of an eleventh embodiment.
Figure 12:
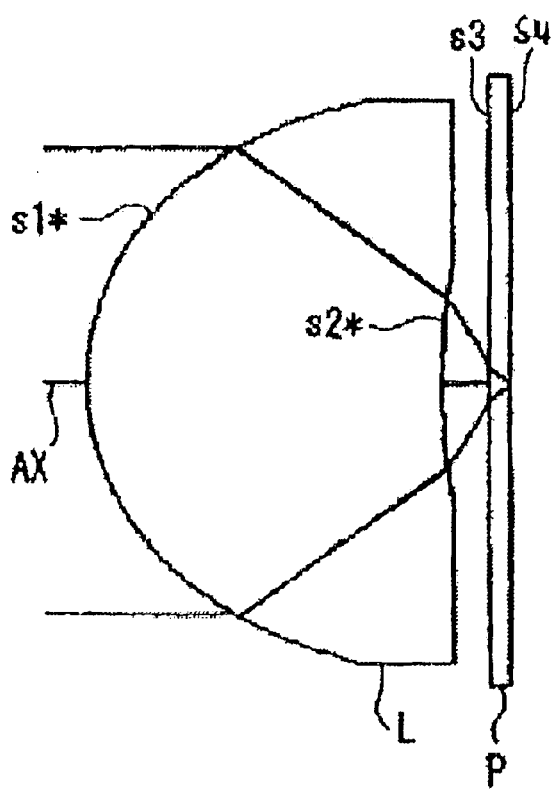
FIG. 12 is a lens arrangement view of a twelfth embodiment.
Figure 13:
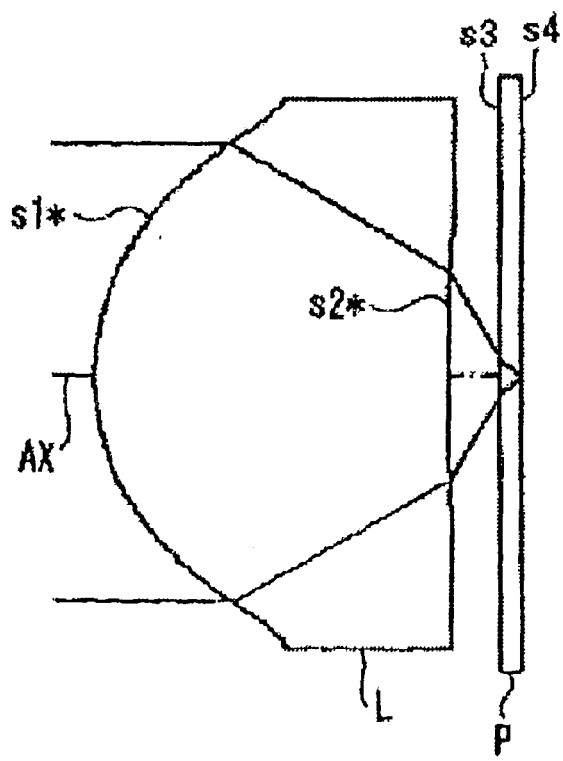
FIG. 13 is a lens arrangement view of a thirteenth embodiment.
Figure 14:
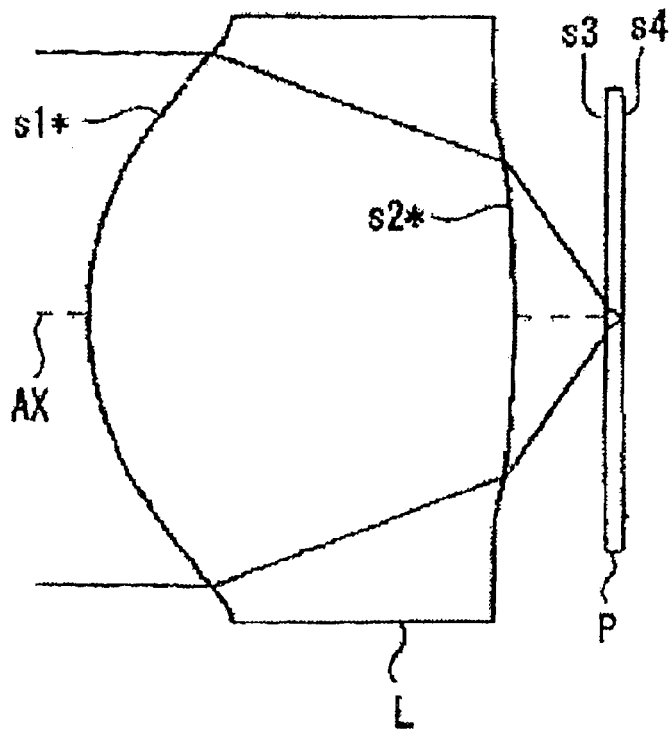
FIG. 14 is a lens arrangement view of a fourteenth embodiment.
Figure 15:
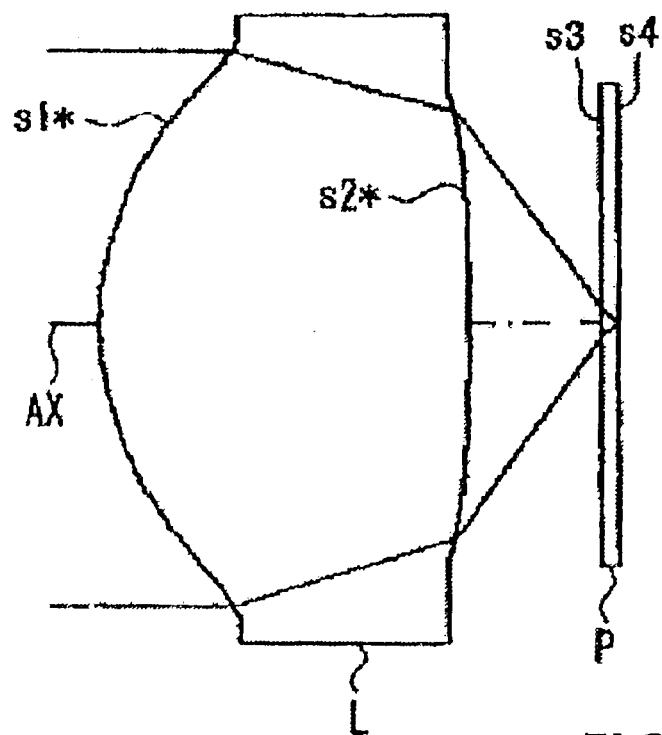
FIG. 15 is a lens arrangement view of a fifteenth embodiment.
Figure 16:
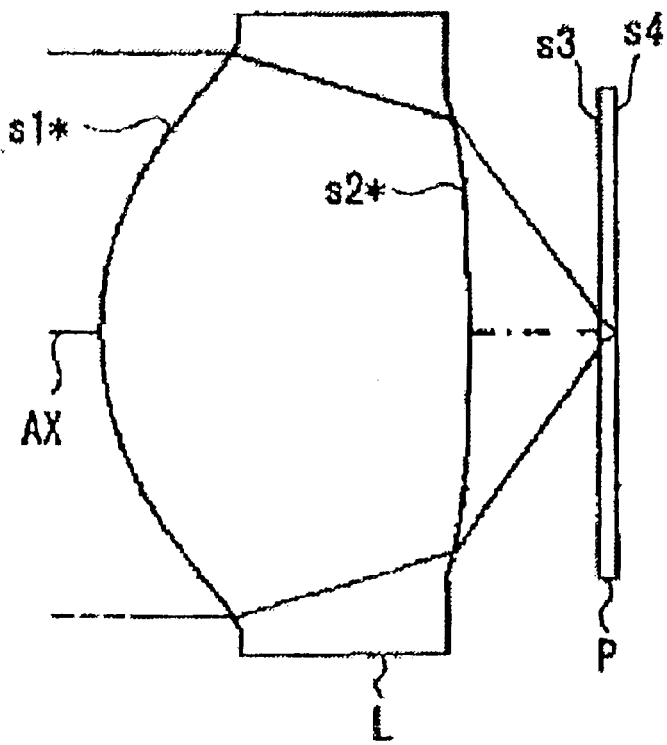
FIG. 16 is a lens arrangement view of a sixteenth embodiment.
Figure 17:
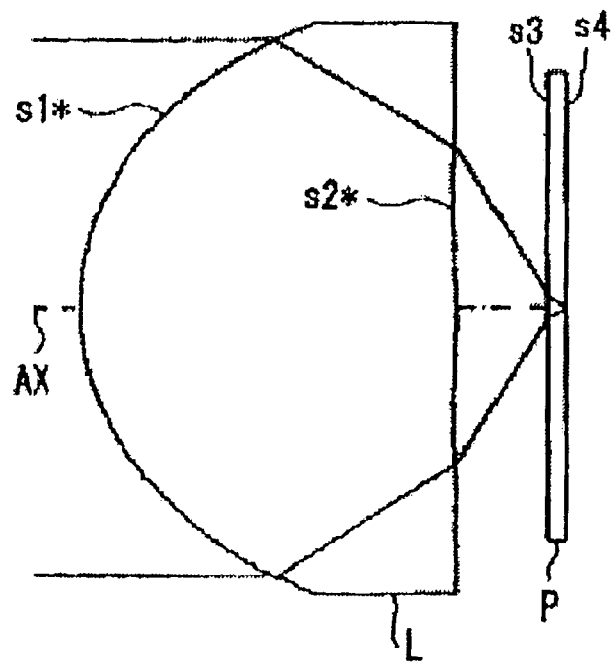
FIG. 17 is a lens arrangement view of a seventeenth embodiment.
Figure 18:
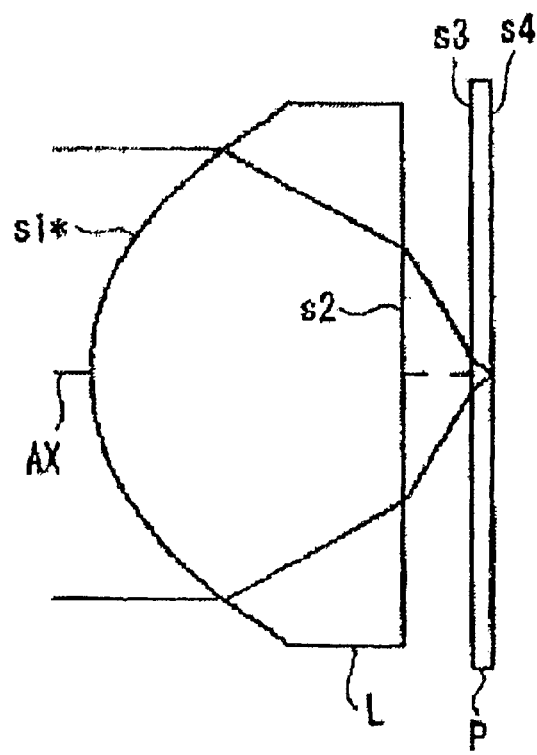
FIG. 18 is a lens arrangement view of an eighteenth embodiment.

Hereinafter, objective lens systems for optical pickups embodying the present invention will be described with reference to the drawings. FIGS. 1 to 18 are lens arrangement views of a first to an eighteenth embodiment. In each lens arrangement view, the surfaces denoted by si (i=1,2, . . . ) are the i-th surfaces counted from the light source side, and the surfaces denoted by si marked with asterisks are aspherical. In each lens arrangement view, the single lens (L) is an objective lens system (L) for optical pickups reading and/or writing information by condensing a luminous flux from the light source onto an optical information recording medium, and from the light source side, a first surface (s1) is convex to the light source side and a second surface (s2) is convex to the image side. Moreover, the lens medium is a homogeneous medium, the object distance is infinite (that is, an infinite system), and at least one of the two surfaces (s1, s2) is aspherical. The planeparallel plate (P) situated on the image side of each objective lens system (L) corresponds to an optical disk substrate (that is, a cover glass for the optical recording surface). Examples of the optical information recording media include optical disks such as CDs, CD-Rs, CD-RWs, CD-ROMs, DVDs, DVD-Rs, DVD-RWs, DVD-ROMs, DVD-RAMs and MDs.

It is desirable for enhancing performance that at least one aspherical surface be provided like in the embodiments. It is more desirable that at least the first surface (s1) be aspherical. That at least the first surface (s1) is aspherical is a condition for achieving higher performance of a high-numerical-aperture objective lens system (L) for optical pickups. In particular, to achieve a higher numerical aperture in a small-size objective lens system (L), since the radius of curvature of the first surface (s1) is small, it is desirable that the first surface (s1) be aspherical to suppress aberrations generated at the fist surface (s1). Considering the securement of the off-axial performance, it is desirable from the viewpoint of design freedom that both surfaces be aspherical like in the first to the seventeenth embodiments.

It is desirable that the objective lens system (L) be bi-convex like in the embodiments. By the objective lens system (L) being bi-convex, the lens diameter can be reduced while the off-axial performance is secured. Moreover, it is desirable that the object distance of the objective lens system (L) be infinite. That the object distance is infinite is a condition for achieving a higher numerical aperture. When the numerical aperture of the objective lens system (L) is high, performance deterioration due to optical disk tilt, lens decentering and the like is a problem, and when the object distance is infinite, the performance deterioration is unignorably large.

Next, conditions to be satisfied by the objective lens system (L) comprising a bi-convex single lens of a homogeneous medium like the embodiments will be described. It is desirable for the curvatures of the light source side surface (that is, the fist surface [s1]) and the image side surface (that is, the second surface [s2]) of the objective lens system [L] to satisfy the following condition (1A), it is more desirable for them to satisfy the following condition (1B), and it is still more desirable for them to satisfy the following condition (1C):

$$-0.45 < r1/r2 < 0.0 \tag{1A}$$

$$-0.35 < r1/r2 < 0.0 \tag{1B}$$

$$-0.15 < r1/r2 < 0.0 \tag{1C}$$

where r1 is the radius of curvature of the first surface (s1); and r2 is the radius of curvature of the second surface (s2).

The conditions (1A), (1B) and (1C) define conditions desirable for securing the back focal length while achieving a higher numerical aperture, and for maintaining compactness while securing the off-axial performance. When the upper limits of the conditions (1A), (1B) and (1C) are exceeded, it is difficult to secure the working distance and the lens weight is heavy. When the lower limit of the condition (1A) is exceeded, it is difficult to secure the thickness of the lens edge. The more the lower limits of the conditions (1B) and (1C) are exceeded, the stronger this tendency is.

It is desirable for the axial thickness of the objective lens system (L) to satisfy the following condition (2A), and it is more desirable for it to satisfy the following condition (2B):

$$1.05 < d/f < 1.4 \quad (2A)$$

$$1.05 < d/f < 1.35 \quad (2B)$$

where d is the axial thickness of the single lens (L); and f is the focal length of the single lens (L).

The conditions (2A) and (2B) define conditions desirable for securing the back focal length while achieving a higher numerical aperture, and for maintaining excellent lens holding capability and compactness. When the upper limit of the condition (2A) is exceeded, it is difficult to secure the working distance and the lens weight is heavy. The more the upper limit of the condition (2B) is exceeded, the stronger this tendency is. When the lower limits of the conditions (2A) and (2B) are exceeded, it is difficult to secure the thickness of the lens edge. In infinite systems, by satisfying the conditions (1A) and (1B), size reduction and a higher numerical aperture can be achieved while the working distance and the off-axial performance are secured. Moreover, irrespective of whether the lens is an infinite system or a finite system, by satisfying the conditions (1B) and (2B) or the conditions (1C) and (2A), size reduction and a higher numerical aperture can be effectively achieved while the working distance and the off-axial performance are secured.

It is desirable for the curvature of the first surface (s1) of the objective lens system (L) to satisfy the following condition (3):

$$0.6 < r1/f < 0.95 \quad (3)$$

where r1 is the radius of curvature of the first surface (s1); and f is the focal length of the first lens (L).

The condition (3) defines a condition desirable for securing the back focal length while achieving a higher numerical aperture. When the upper limit of the condition (3) is exceeded, it is difficult to secure the off-axial performance. When the lower limit of the condition (3) is exceeded, the radius of curvature is too small, so that the local tilt of the lens is large in a peripheral part of the lens when the numerical aperture is increased and this makes the manufacture difficult (lenses of this type are generally manufactured by molding, and the molding die therefor is difficult to manufacture).

It is desirable for the curvature of the second surface (s2) of the objective lens system (L) to satisfy the following condition (4):

$$-300 < r2/f < -1.5 \quad (4)$$

where r2 is the radius of curvature of the second surface (s2); and f is the focal length of the single lens (L).

The condition (4) defines a condition desirable for securing the back focal length while achieving a higher numerical aperture. When the lower limit of the condition (4) is exceeded, it is difficult to secure the working distance, so that the objective lens system (L) readily collides with the optical information recording medium. When the upper limit of the condition (4) is exceeded, the radius of curvature is too small, so that it is difficult to secure the off-axial performance and it is also difficult to correct higher-order aberrations.

It is desirable for the relationship between the surfaces (s1, s2) of the objective lens system (L) and the ray to satisfy the following condition (5):

$$-40 < \theta 1 - \theta 2 < 20 \quad (5)$$

where $\theta 1$ is the angle (°) which the ray (outermost ray) incident on the margin of the effective diameter of the first surface (s1) forms with the first surface (s1); and $\theta 2$ is the angle (°) which the ray (outermost ray) exiting from the margin of the effective diameter of the second surface (s1) forms with the second surface (s2).

The condition (5) defines a condition for achieving higher performance in a high-numerical-aperture objective lens system (L) for optical pickups. When the upper limit or the lower limit of the condition (5) is exceeded, off-axial characteristics are deteriorated, so that the sensitivity to decentering is severe.

It is desirable for the relationship between the first surface (s1) of the objective lens system (L) and the ray to satisfy the following condition (6):

$$0.35 < (n-1)\sin \theta 1 < 0.8 \quad (6)$$

where n is the refractive index of the single lens (L) in the wavelength used; and $\theta 1$ is the angle (°) which the ray (outermost ray) incident on the margin of the effective diameter of the first surface (s1) forms with the first surface (s1).

The condition (6) defines a condition for achieving higher performance while the manufacture is easy in a high-numerical-aperture objective lens system (L) for optical pickups. When the lower limit of the condition (6) is exceeded, it is difficult to secure a high numerical aperture. When the upper limit of the condition (6) is exceeded, the angle $\theta 1$ is extremely large, so that the manufacture of the lens is difficult or no optical glass that has a practical refractive index is present.

It is desirable for the configuration of each surface of the objective lens system (L) to satisfy the following condition (7):

$$0.3 < (r2+r1)/(r2-r1) < 1.0 \quad (7)$$

where r1 is the radius of curvature of the first surface (s1); and r2 is the radius of curvature of the second surface (s2).

The condition (7) defines a condition for achieving higher performance, particularly a condition for correcting spherical aberration in a high-numerical-aperture objective lens system (L) for optical pickups. When the range of the condition (7) is exceeded, the tilt of spherical aberration in the third-order range is large, so that aberrations tend to meander by the correction of higher-order aberrations. Consequently, it is difficult to achieve a higher numerical aperture.

When an aspherical surface is used as the first surface (s1), it is desirable to satisfy the following condition (8):

$$0.15 < WD/f < 0.5 \tag{8}$$

where

WD is the working distance; and f is the focal length of the single lens (L).

The condition (8) defines a condition desirable for securing the back focal length while achieving a higher numerical aperture, and for maintaining compactness. When the upper limit of the condition (8) is exceeded, it is difficult to secure off-axial aberration performance and the lens diameter is large. When the lower limit of the condition (8) is exceeded, the working distance is too short, so that the objective lens system (L) and the optical information recording medium readily collide with each other.

It is desirable for the aspherical surface used as the first surface (s1) to satisfy the following condition (9a) and it is desirable for an aspherical surface used as the second surface (s2) to satisfy the following condition (9b); either of only one of the conditions (9a) and (9b) being satisfied and both of them being satisfied will do:

$$0.08 < \alpha\,max - \alpha\,min < 1.0 \tag{9a}$$

$$0.01 < \alpha\,max - \alpha\,min < 0.5 \tag{9b}$$

where $\alpha$ max is the maximum value of $\alpha$ (h) at $0 \leq h \leq hmax$;

$\alpha$ min is the minimum value of $\alpha$ (h) at $0 \leq h \leq hmax$;

$\alpha(h) \equiv dz(h)/dh - h/[r \cdot \{1-(1+k)\cdot(h/r)^2\}^{1/2}]$ h is the incident height, from the optical axis (AX), of the axial ray incident on the aspherical surface;

hmax is the incident height, from the optical axis (AX), of the axial marginal ray incident on the aspherical surface;

z(h) is the aspherical surface configuration (the distance from the vertex of the aspherical surface along the optical axis (AX) at each height h);

$$z(h) = r - \{r^2 - (1+k)\cdot h^2\}^{1/2} + (A4 \cdot h^4 + A6 \cdot h^6 + A8 \cdot h^8 + \ldots) \tag{AS}$$

r is the paraxial radius of curvature of the aspherical surface;

k is the conic constant;

Ai is the i-th aspherical coefficient of h; and dz(h)/dh is the differential value with respect to the incident height h of the aspherical surface configuration.

The conditions (9a) and (9b) define conditions for achieving higher performance in a high-numerical-aperture objective lens system (L) for optical pickups. When the upper limits of the conditions (9a) and (9b) are exceeded, higher-order aberrations due to the aspherical surface are caused and this makes aberration correction difficult, which is undesirable in achieving higher performance. When the lower limits of the conditions (9a) and (9b) are exceeded, the aberration correction effect by the aspherical surface is low, so that it is difficult to correct, particularly, spherical aberration and this makes it difficult to achieve higher performance.

It is desirable for the aspherical surface used as the first surface (s1) to satisfy the following condition (10a) and it is desirable for the aspherical surface used as the second surface (s2) to satisfy the following condition (10b); either of only one of the conditions (10a) and (10b) being satisfied and both of them being satisfied will do:

$$-0.01 < \Delta(hmax)/f < 0.3 \tag{10a}$$

$$-0.01 < \Delta(hmax)/f < 0.1 \tag{10b}$$

where $\Delta(h)$ is the difference between the distance z(h) from the vertex of the aspherical surface along the optical axis (AX) and the distance from the vertex of a reference quadratic curve $[\equiv = r - \{r^2 - (1+k)\cdot h^2\}^{1/2}]$ along the optical axis (AX) at a height h from the optical axis (AX);

h is the incident height, from the optical axis (AX), of the axial ray incident on the aspherical surface;

hmax is the incident height, from the optical axis (AX), of the axial marginal ray incident on the aspherical surface;

z(h) is the aspherical configuration (the distance from the vertex of the aspherical surface along the optical axis (AX) at each height h);

$$z(h) = r - \{r^2 - (1+k)\cdot h^2\}^{1/2} + (A4 \cdot h^4 + A6 \cdot h^6 + A8 \cdot h^8 + \ldots) \tag{AS}$$

r is the paraxial radius of curvature of the aspherical surface;

k is the conic constant;

Ai is the i-th aspherical coefficient of h; and f is the focal length of the objective lens system (L).

The conditions (10a) and (10b) define conditions for achieving higher performance in a high-numerical-aperture objective lens system (L) for optical pickups. When the upper or the lower limits of the conditions (10a) and (10b) are exceeded, higher-order aberrations due to the aspherical surface are caused and this makes aberration correction difficult, which is undesirable in achieving higher performance.

Hereinafter, the objective lens systems for optical pickups embodying the present invention will be further concretely described with reference to construction data and the like.

In the construction data of each embodiment, si (i=1, 2, 3, 4) represents the i-th surface counted from the light source side, ri (i=1, 2, 3, 4) represents the radius of curvature (mm) of the surface si, di (i=1, 2, 3) represents the i-th axial distance (axial thickness, mm) counted from the light source side, and Ni (i=1, 2) represents the refractive index (to the light of a wavelength of 405 nm) of the i-th optical element counted from the light source side. The surfaces si marked with asterisks are aspherical, and are defined by the expression (AS) shown above expressing the surface configuration of the aspherical surface. The wavelength ($\lambda$) of the ray used, the numerical aperture (NA), the aspherical data of each aspherical surface (omitted when Ai=0), and the corresponding values of the conditions (9a), (9b), (10a) and (10b) related to the aspherical surface are shown together with other data. Table 1 shows the corresponding values of the conditions (1A), (1B), (1C), (2A), (2B) and (3) to (8)

EXAMPLE 1

| | Wavelength = 405 nm NA = 0.85 | | | |
|---|---|---|---|---|
| Surface | Radius of Curvature | Curvature | Axial Distance | Refractive Index (405 nm) |
| 1* | 1.415 | 0.707 | 1.950 | 1.79976 |
| 2* | −105.327 | −0.009 | 0.620 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.83037 | 0.00000 |
| A4 | 1.91081E−02 | 1.15440E−01 |
| A6 | 6.44974E−04 | −1.92143E−01 |
| A8 | 4.08682E−03 | 1.02320E−01 |
| A10 | −2.51009E−03 | −2.11220E−02 |
| A12 | 5.85854E−06 | 0.00000E+00 |
| A14 | 6.22971E−04 | 0.00000E+00 |
| A16 | −2.44992E−04 | 0.00000E+00 |

| Value of Condition (1) | |
|---|---|
| r1/r2 | −0.0134 |

| Value of Condition (2) | |
|---|---|
| d/f | 1.1080 |

| Value of Condition (3) | |
|---|---|
| r1/f | 0.8039 |

| Value of Condition (4) | |
|---|---|
| r2/f | −59.8496 |

| Value of Condition (5) | |
|---|---|
| θ1 − θ2 | −19.8318 |

| Value of Condition (6) | |
|---|---|
| (n − 1)sinθ1 | 0.5782 |

| Value of Condition (7) | |
|---|---|
| (r2 + r1)/(r2 − r1) | 0.9735 |

| Value of Condition (8) | |
|---|---|
| WD/f | 0.3523 |

| Value of Condition (9) | | |
|---|---|---|
| dz(h)/dh − h/(r*SQRT(1 − (1 + k)*(h/r)^2)) | S1 | S2 |
| 0.0hmax | 0.0000 | 0.0000 |
| 0.1hmax | 0.0003 | 0.0006 |
| 0.2hmax | 0.0021 | 0.0041 |
| 0.3hmax | 0.0071 | 0.0118 |
| 0.4hmax | 0.0175 | 0.0219 |
| 0.5hmax | 0.0358 | 0.0298 |
| 0.6hmax | 0.0653 | 0.0291 |
| 0.7hmax | 0.1089 | 0.0140 |
| 0.8hmax | 0.1628 | −0.0185 |
| 0.9hmax | 0.1787 | −0.0669 |
| 1.0hmax | −0.1320 | −0.1289 |
| αmax − αmin | 0.3107 | 0.1588 |

| Value of Condition (10) | | |
|---|---|---|
| Δ (h)/f | S1 | S2 |
| 0.0hmax | 0.0000 | 0.0000 |
| 0.1hmax | 0.0000 | 0.0000 |
| 0.2hmax | 0.0001 | 0.0001 |
| 0.3hmax | 0.0005 | 0.0006 |
| 0.4hmax | 0.0015 | 0.0016 |
| 0.5hmax | 0.0037 | 0.0032 |
| 0.6hmax | 0.0079 | 0.0051 |
| 0.7hmax | 0.0152 | 0.0065 |
| 0.8hmax | 0.0268 | 0.0064 |
| 0.9hmax | 0.0420 | 0.0039 |
| 1.0hmax | 0.0487 | −0.0020 |

EXAMPLE 2

| | Wavelength = 405 nm NA = 0.85 | | | |
|---|---|---|---|---|
| Surface | Radius of Curvature | Curvature | Axial Distance | Refractive Index (405 nm) |
| 1* | 1.459 | 0.685 | 2.200 | 1.79976 |
| 2* | −15.284 | −0.065 | 0.521 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.84217 | 0.00000 |
| A4 | 1.73630E−02 | 1.26963E−01 |
| A6 | −4.88457E−04 | −2.46413E−01 |
| A8 | 3.61758E−03 | 1.63141E−01 |
| A10 | −1.48108E−03 | −4.20114E−02 |
| A12 | −8.02211E−04 | 0.00000E+00 |
| A14 | 8.41579E−04 | 0.00000E+00 |
| A16 | −2.31841E−04 | 0.00000E+00 |

| Value of Condition (1) | |
|---|---|
| r1/r2 | −0.0955 |

| Value of Condition (2) | |
|---|---|
| d/f | 1.2439 |

| Value of Condition (3) | |
|---|---|
| r1/f | 0.8249 |

| Value of Condition (4) | |
|---|---|
| r2/f | −8.6417 |

| Value of Condition (5) | |
|---|---|
| θ1 − θ2 | −17.2898 |

| Value of Condition (6) | |
|---|---|
| (n − 1)sinθ1 | 0.5917 |

Value of Condition (7)

-continued

Wavelength = 405 nm
NA = 0.85

| (r2 + r1)/(r2 − r1) | 0.8257 |
|---|---|

Value of Condition (8)

| WD/f | 0.2948 |
|---|---|

Value of Condition (9)

| dz(h)/dh − h/<br>(r*SQRT(1 − (1 + k)*(h/r)^2)) | S1 | S2 |
|---|---|---|
| 0.0hmax | 0.0000 | 0.0000 |
| 0.1hmax | 0.0002 | 0.0004 |
| 0.2hmax | 0.0019 | 0.0030 |
| 0.3hmax | 0.0064 | 0.0089 |
| 0.4hmax | 0.0154 | 0.0172 |
| 0.5hmax | 0.0312 | 0.0250 |
| 0.6hmax | 0.0562 | 0.0280 |
| 0.7hmax | 0.0924 | 0.0223 |
| 0.8hmax | 0.1374 | 0.0056 |
| 0.9hmax | 0.1608 | −0.0216 |
| 1.0hmax | −0.0267 | −0.0575 |
| αmax − αmin | 0.1875 | 0.0855 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0001 |
| 0.3hmax | 0.0004 | 0.0004 |
| 0.4hmax | 0.0013 | 0.0011 |
| 0.5hmax | 0.0032 | 0.0022 |
| 0.6hmax | 0.0068 | 0.0036 |
| 0.7hmax | 0.0131 | 0.0050 |
| 0.8hmax | 0.0228 | 0.0058 |
| 0.9hmax | 0.0359 | 0.0054 |
| 1.0hmax | 0.0446 | 0.0034 |

EXAMPLE 3

Wavelength = 405 nm
NA = 0.85

| Surface | Radius of Curvature | Curvature | Axial Distance | Refractive Index (405 nm) |
|---|---|---|---|---|
| 1* | 1.538 | 0.650 | 2.450 | 1.79976 |
| 2* | −5.259 | −0.190 | 0.455 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.88436 | 0.00000 |
| A4 | 1.48606E−02 | 1.82461E−01 |
| A6 | 8.23199E−04 | −3.69446E−01 |
| A8 | −5.20556E−04 | 2.55778E−01 |
| A10 | 1.95811E−03 | 3.47100E−03 |
| A12 | −2.35768E−03 | −5.86196E−02 |
| A14 | 1.14495E−03 | −2.79778E−02 |
| A16 | −2.38966E−04 | 2.97970E−02 |

Value of Condition (1)

| r1/r2 | −0.2923 |
|---|---|

Value of Condition (2)

-continued

Wavelength = 405 nm
NA = 0.85

| d/f | 1.3831 |
|---|---|

Value of Condition (3)

| r1/f | 0.8680 |
|---|---|

Value of Condition (4)

| r2/f | −2.9692 |
|---|---|

Value of Condition (5)

| θ1 − θ2 | −24.6117 |
|---|---|

Value of Condition (6)

| (n − 1)sinθ1 | 0.5515 |
|---|---|

Value of Condition (7)

| (r2 + r1)/(r2 − r1) | 0.5476 |
|---|---|

Value of Condition (8)

| WD/f | 0.2570 |
|---|---|

Value of Condition (9)

| dz(h)/dh − h/<br>(r*SQRT(1 − (1 + k)*(h/r)^2)) | S1 | S2 |
|---|---|---|
| 0.0hmax | 0.0000 | 0.0000 |
| 0.1hmax | 0.0002 | 0.0005 |
| 0.2hmax | 0.0016 | 0.0037 |
| 0.3hmax | 0.0055 | 0.0111 |
| 0.4hmax | 0.0132 | 0.0217 |
| 0.5hmax | 0.0263 | 0.0326 |
| 0.6hmax | 0.0463 | 0.0396 |
| 0.7hmax | 0.0735 | 0.0392 |
| 0.8hmax | 0.1035 | 0.0307 |
| 0.9hmax | 0.1063 | 0.0157 |
| 1.0hmax | −0.0821 | −0.0044 |
| αmax − αmin | 0.1884 | 0.0440 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0001 |
| 0.3hmax | 0.0003 | 0.0005 |
| 0.4hmax | 0.0011 | 0.0013 |
| 0.5hmax | 0.0027 | 0.0026 |
| 0.6hmax | 0.0058 | 0.0045 |
| 0.7hmax | 0.0108 | 0.0065 |
| 0.8hmax | 0.0183 | 0.0083 |
| 0.9hmax | 0.0276 | 0.0095 |
| 1.0hmax | 0.0314 | 0.0098 |

EXAMPLE 4

Wavelength = 405 nm
NA = 0.82

| Surface | Radius of Curvature | Curvature | Axial Distance | Refractive Index (405 nm) |
|---|---|---|---|---|
| 1* | 1.551 | 0.645 | 2.450 | 1.79976 |
| 2* | −4.752 | −0.210 | 0.465 | |
| 3 | INFINITY | 0.000 | 0.100 | 1.62040 |

-continued

Wavelength = 405 nm
NA = 0.82

| | | | |
|---|---|---|---|
| 4 | INFINITY | 0.000 | |

| Aspherical Coefficient | S1 | S2 |
|---|---|---|
| k | −0.89253 | 0.00000 |
| A4 | 1.42128E−02 | 2.08955E−01 |
| A6 | 1.82617E−03 | −4.66714E−01 |
| A8 | −2.06479E−03 | 3.90194E−01 |
| A10 | 2.76298E−03 | 7.53771E−03 |
| A12 | −2.36295E−03 | −2.19578E−01 |
| A14 | 9.72597E−04 | 7.91159E−02 |
| A16 | −1.96717E−04 | 2.24749E−02 |

Value of Condition (1)

| r1/r2 | −0.3263 |
|---|---|

Value of Condition (2)

| d/f | 1.3863 |
|---|---|

Value of Condition (3)

| r1/f | 0.8775 |
|---|---|

Value of Condition (4)

| r2/f | −2.6891 |
|---|---|

Value of Condition (5)

| θ1 − θ2 | −19.4753 |
|---|---|

Value of Condition (6)

| (n − 1)sinθ1 | 0.5579 |
|---|---|

Value of Condition (7)

| (r2 + r1)/(r2 − r1) | 0.5079 |
|---|---|

Value of Condition (8)

| WD/f | 0.2631 |
|---|---|

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0002 | 0.0004 |
| 0.2hmax | 0.0014 | 0.0031 |
| 0.3hmax | 0.0048 | 0.0095 |
| 0.4hmax | 0.0116 | 0.0191 |
| 0.5hmax | 0.0230 | 0.0299 |
| 0.6hmax | 0.0403 | 0.0388 |
| 0.7hmax | 0.0637 | 0.0431 |
| 0.8hmax | 0.0896 | 0.0414 |
| 0.9hmax | 0.0974 | 0.0342 |
| 1.0hmax | −0.0088 | 0.0223 |
| αmax − αmin | 0.1062 | 0.0431 |

Value of Condition (10)

| Δ(h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0001 |
| 0.3hmax | 0.0003 | 0.0003 |
| 0.4hmax | 0.0009 | 0.0010 |
| 0.5hmax | 0.0023 | 0.0021 |
| 0.6hmax | 0.0049 | 0.0037 |
| 0.7hmax | 0.0091 | 0.0055 |

-continued

Wavelength = 405 nm
NA = 0.82

| 0.8hmax | 0.0154 | 0.0075 |
|---|---|---|
| 0.9hmax | 0.0234 | 0.0092 |
| 1.0hmax | 0.0285 | 0.0105 |

EXAMPLE 5

Wavelength = 405 nm
NA = 0.80

| Surface | Radius of Curvature | Curvature | Axial Distance | Refractive Index (405 nm) |
|---|---|---|---|---|
| 1* | 1.591 | 0.629 | 2.450 | 1.79976 |
| 2* | −3.983 | −0.251 | 0.496 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.91697 | 0.00000 |
| A4 | 1.27422E−02 | 1.91549E−01 |
| A6 | 1.51859E−03 | −4.37132E−01 |
| A8 | −2.75655E−03 | 3.77865E−01 |
| A10 | 2.99969E−03 | 8.97375E−03 |
| A12 | −2.36591E−03 | −1.94852E−01 |
| A14 | 8.67830E−04 | 1.24950E−02 |
| A16 | −1.72780E−04 | 6.54183E−02 |

Value of Condition (1)

| r1/r2 | −0.3994 |
|---|---|

Value of Condition (2)

| d/f | 1.3870 |
|---|---|

Value of Condition (3)

| r1/f | 0.9006 |
|---|---|

Value of Condition (4)

| r2/f | −2.2547 |
|---|---|

Value of Condition (5)

| θ1 − θ2 | −22.5102 |
|---|---|

Value of Condition (6)

| (n − 1)sinθ1 | 0.5225 |
|---|---|

Value of Condition (7)

| (r2 + r1)/(r2 − r1) | 0.4292 |
|---|---|

Value of Condition (8)

| WD/f | 0.2807 |
|---|---|

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0001 | 0.0004 |
| 0.2hmax | 0.0012 | 0.0029 |
| 0.3hmax | 0.0039 | 0.0087 |
| 0.4hmax | 0.0094 | 0.0174 |

-continued

| | Wavelength = 405 nm NA = 0.80 | | |
|---|---|---|---|
| 0.5hmax | | 0.0183 | 0.0271 |
| 0.6hmax | | 0.0313 | 0.0351 |
| 0.7hmax | | 0.0475 | 0.0391 |
| 0.8hmax | | 0.0618 | 0.0383 |
| 0.9hmax | | 0.0535 | 0.0333 |
| 1.0hmax | | −0.0540 | 0.0243 |
| αmax − αmin | | 0.1157 | 0.0391 |

| Value of Condition (10) | | |
|---|---|---|
| Δ (h)/f | S1 | S2 |
| 0.0hmax | 0.0000 | 0.0000 |
| 0.1hmax | 0.0000 | 0.0000 |
| 0.2hmax | 0.0000 | 0.0001 |
| 0.3hmax | 0.0002 | 0.0003 |
| 0.4hmax | 0.0007 | 0.0009 |
| 0.5hmax | 0.0018 | 0.0019 |
| 0.6hmax | 0.0038 | 0.0033 |
| 0.7hmax | 0.0069 | 0.0050 |
| 0.8hmax | 0.0113 | 0.0068 |
| 0.9hmax | 0.0162 | 0.0084 |
| 1.0hmax | 0.0174 | 0.0098 |

EXAMPLE 6

| | Wavelength = 405 nm NA = 0.85 | | | |
|---|---|---|---|---|
| Surface | Radius of Curvature | Curvature | Axial Distance | Refractive Index (405 nm) |
| 1* | 0.943 | 1.061 | 1.580 | 1.79976 |
| 2* | −300.983 | −0.003 | 0.239 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.60084 | 0.00000 |
| A4 | 3.66727E−02 | 1.59356E+00 |
| A6 | 1.99091E−02 | −8.37323E+00 |
| A8 | 1.61398E−02 | 2.10635E+01 |
| A10 | −4.79205E−04 | −1.45493E+01 |
| A12 | 2.02963E−03 | −2.31810E+01 |
| A14 | 9.86532E−03 | 1.09108E−01 |
| A16 | −6.15488E−03 | −5.90937E+00 |

| Value of Condition (1) | |
|---|---|
| r1/r2 | −0.0031 |

| Value of Condition (2) | |
|---|---|
| d/f | 1.3414 |

| Value of Condition (3) | |
|---|---|
| r1/f | 0.8004 |

| Value of Condition (4) | |
|---|---|
| r2/f | −255.5338 |

| Value of Condition (5) | |
|---|---|
| θ1 − θ2 | 10.7943 |

| Value of Condition (6) | |

-continued

| | Wavelength = 405 nm NA = 0.85 | |
|---|---|---|
| (n − 1)sinθ1 | | 0.7064 |

| Value of Condition (7) | |
|---|---|
| (r2 + r1)/(r2 − r1) | 0.9938 |

| Value of Condition (8) | |
|---|---|
| WD/f | 0.2029 |

| Value of Condition (9) | | |
|---|---|---|
| dz(h)/dh − h/ (r*SQRT(1 − (1 + k)*(h/r)^2)) | S1 | S2 |
| 0.0hmax | 0.0000 | 0.0000 |
| 0.1hmax | 0.0001 | 0.0004 |
| 0.2hmax | 0.0012 | 0.0035 |
| 0.3hmax | 0.0043 | 0.0109 |
| 0.4hmax | 0.0108 | 0.0234 |
| 0.5hmax | 0.0231 | 0.0403 |
| 0.6hmax | 0.0448 | 0.0597 |
| 0.7hmax | 0.0822 | 0.0793 |
| 0.8hmax | 0.1469 | 0.0969 |
| 0.9hmax | 0.2598 | 0.1117 |
| 1.0hmax | 0.4545 | 0.1236 |
| αmax − αmin | 0.4545 | 0.1236 |

| Value of Condition (10) | | |
|---|---|---|
| Δ (h)/f | S1 | S2 |
| 0.0hmax | 0.0000 | 0.0000 |
| 0.1hmax | 0.0000 | 0.0000 |
| 0.2hmax | 0.0001 | 0.0001 |
| 0.3hmax | 0.0003 | 0.0003 |
| 0.4hmax | 0.0009 | 0.0009 |
| 0.5hmax | 0.0023 | 0.0020 |
| 0.6hmax | 0.0051 | 0.0038 |
| 0.7hmax | 0.0103 | 0.0062 |
| 0.8hmax | 0.0198 | 0.0093 |
| 0.9hmax | 0.0366 | 0.0130 |
| 1.0hmax | 0.0662 | 0.0172 |

EXAMPLE 7

| | Wavelength = 405 nm NA = 0.85 | | | |
|---|---|---|---|---|
| Surface | Radius of Curvature | Curvature | Axial Distance | Refractive Index (405 nm) |
| 1* | 0.989 | 1.011 | 1.600 | 1.79976 |
| 2* | −5.484 | −0.182 | 0.269 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.63957 | 0.00000 |
| A4 | 3.26063E−02 | 1.16214E+00 |
| A6 | 6.71668E−03 | −6.60375E+00 |
| A8 | 2.66343E−02 | 1.49062E+01 |
| A10 | −2.94982E−02 | 3.64749E−01 |
| A12 | −3.31820E−03 | −6.06210E+01 |
| A14 | 3.64255E−02 | 6.42893E+01 |
| A16 | −3.21089E−02 | 2.99169E+01 |

| Value of Condition (1) | |

-continued

| Wavelength = 405 nm NA = 0.85 | |
|---|---|
| r1/r2 | −0.1803 |

| Value of Condition (2) | |
|---|---|
| d/f | 1.3598 |

| Value of Condition (3) | |
|---|---|
| r1/f | 0.8403 |

| Value of Condition (4) | |
|---|---|
| r2/f | −4.6603 |

| Value of Condition (5) | |
|---|---|
| θ1 − θ2 | −7.8176 |

| Value of Condition (6) | |
|---|---|
| (n − 1)sinθ1 | 0.6372 |

| Value of Condition (7) | |
|---|---|
| (r2 + r1)/(r2 − r1) | 0.6945 |

| Value of Condition (8) | |
|---|---|
| WD/f | 0.2284 |

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0001 | 0.0006 |
| 0.2hmax | 0.0011 | 0.0044 |
| 0.3hmax | 0.0037 | 0.0131 |
| 0.4hmax | 0.0090 | 0.0265 |
| 0.5hmax | 0.0187 | 0.0416 |
| 0.6hmax | 0.0346 | 0.0547 |
| 0.7hmax | 0.0589 | 0.0626 |
| 0.8hmax | 0.0916 | 0.0641 |
| 0.9hmax | 0.1179 | 0.0598 |
| 1.0hmax | 0.0452 | 0.0500 |
| αmax − αmin | 0.1179 | 0.0641 |

Value of Condition (10)

| Δ(h)/f | S1 | S2 |
|---|---|---|
| 0.0hmax | 0.0000 | 0.0000 |
| 0.1hmax | 0.0000 | 0.0000 |
| 0.2hmax | 0.0000 | 0.0001 |
| 0.3hmax | 0.0002 | 0.0005 |
| 0.4hmax | 0.0007 | 0.0013 |
| 0.5hmax | 0.0019 | 0.0027 |
| 0.6hmax | 0.0041 | 0.0048 |
| 0.7hmax | 0.0080 | 0.0074 |
| 0.8hmax | 0.0144 | 0.0101 |
| 0.9hmax | 0.0234 | 0.0128 |
| 1.0hmax | 0.0318 | 0.0151 |

EXAMPLE 8

| Wavelength = 405 nm NA = 0.85 | | | | |
|---|---|---|---|---|
| Surface | Radius of Curvature | Curvature | Axial Distance | Refractive Index (405 nm) |
| 1* | 1.043 | 0.959 | 1.600 | 1.79976 |
| 2* | −2.784 | −0.359 | 0.309 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.66845 | 0.00000 |
| A4 | 2.47368E−02 | 1.03753E+00 |
| A6 | 3.11076E−03 | −5.59870E+00 |
| A8 | 5.68184E−03 | 1.21514E+01 |
| A10 | −8.89105E−03 | 0.00000E+00 |
| A12 | −2.62307E−02 | −5.54429E+01 |
| A14 | 3.64878E−02 | 1.05236E+02 |
| A16 | −3.65864E−02 | 6.47890E+01 |

Value of Condition (1)

| r1/r2 | −0.3746 |
|---|---|

Value of Condition (2)

| d/f | 1.3733 |
|---|---|

Value of Condition (3)

| r1/f | 0.8951 |
|---|---|

Value of Condition (4)

| r2/f | −2.3896 |
|---|---|

Value of Condition (5)

| θ1 − θ2 | −31.0168 |
|---|---|

Value of Condition (6)

| (n −1)sinθ1 | 0.5126 |
|---|---|

Value of Condition (7)

| (r2 + r1)/(r2 − r1) | 0.4550 |
|---|---|

Value of Condition (8)

| WD/f | 0.2652 |
|---|---|

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0001 | 0.0011 |
| 0.2hmax | 0.0008 | 0.0078 |
| 0.3hmax | 0.0027 | 0.0221 |
| 0.4hmax | 0.0066 | 0.0403 |
| 0.5hmax | 0.0130 | 0.0554 |
| 0.6hmax | 0.0225 | 0.0617 |
| 0.7hmax | 0.0332 | 0.0585 |
| 0.8hmax | 0.0348 | 0.0485 |

-continued

| Wavelength = 405 nm NA = 0.85 | | |
|---|---|---|
| 0.9hmax | −0.0190 | 0.0335 |
| 1.0hmax | −0.3152 | 0.0143 |
| αmax − αmin | 0.3500 | 0.0617 |

| Value of Condition (10) | | |
|---|---|---|
| Δ (h)/f | S1 | S2 |
| 0.0hmax | 0.0000 | 0.0000 |
| 0.1hmax | 0.0000 | 0.0000 |
| 0.2hmax | 0.0000 | 0.0002 |
| 0.3hmax | 0.0002 | 0.0010 |
| 0.4hmax | 0.0006 | 0.0028 |
| 0.5hmax | 0.0014 | 0.0055 |
| 0.6hmax | 0.0029 | 0.0088 |
| 0.7hmax | 0.0053 | 0.0121 |
| 0.8hmax | 0.0083 | 0.0151 |
| 0.9hmax | 0.0098 | 0.0174 |
| 1.0hmax | −0.0015 | 0.0188 |

EXAMPLE 9

| | Wavelength = 405 nm NA = 0.85 | | | |
|---|---|---|---|---|
| Surface | Radius of Curvature | Curvature | Axial Distance | Refractive Index (405 nm) |
| 1* | 1.061 | 0.942 | 1.600 | 1.79976 |
| 2* | −2.548 | −0.392 | 0.323 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.69253 | 0.00000 |
| A4 | 2.21394E−02 | 8.27968E−01 |
| A6 | −8.51351E−04 | −4.68761E+00 |
| A8 | −8.93629E−04 | 1.08381E+01 |
| A10 | −2.80796E−03 | −5.67677E+00 |
| A12 | −4.16396E−02 | −4.90836E+01 |
| A14 | 3.38710E−02 | 8.67003E+01 |
| A16 | −2.77796E−02 | −4.27494E+01 |

| Value of Condition (1) | |
|---|---|
| r1/r2 | −0.4164 |

| Value of Condition (2) | |
|---|---|
| d/f | 1.3717 |

| Value of Condition (3) | |
|---|---|
| r1/f | 0.9096 |

| Value of Condition (4) | |
|---|---|
| r2/f | −2.1844 |

| Value of Condition (5) | |
|---|---|
| θ1 − θ2 | −23.2062 |

| Value of Condition (6) | |
|---|---|
| (n − 1)sinθ1 | 0.5190 |

| Value of Condition (7) | |
|---|---|

-continued

| Wavelength = 405 nm NA = 0.85 | |
|---|---|
| (r2 + r1)/(r2 − r1) | 0.4120 |

| Value of Condition (8) | |
|---|---|
| WD/f | 0.2770 |

| Value of Condition (9) | | |
|---|---|---|
| dz(h)/dh − h/ (r*SQRT(1 − (1 + k)*(h/r)^2)) | S1 | S2 |
| 0.0hmax | 0.0000 | 0.0000 |
| 0.1hmax | 0.0001 | 0.0005 |
| 0.2hmax | 0.0006 | 0.0039 |
| 0.3hmax | 0.0020 | 0.0116 |
| 0.4hmax | 0.0046 | 0.0226 |
| 0.5hmax | 0.0088 | 0.0343 |
| 0.6hmax | 0.0145 | 0.0431 |
| 0.7hmax | 0.0197 | 0.0470 |
| 0.8hmax | 0.0173 | 0.0463 |
| 0.9hmax | −0.0170 | 0.0420 |
| 1.0hmax | −0.1606 | 0.0337 |
| αmax − αmin | −0.1803 | 0.0470 |

| Value of Condition (10) | | |
|---|---|---|
| Δ (h)/f | S1 | S2 |
| 0.0hmax | 0.0000 | 0.0000 |
| 0.1hmax | 0.0000 | 0.0000 |
| 0.2hmax | 0.0000 | 0.0001 |
| 0.3hmax | 0.0001 | 0.0004 |
| 0.4hmax | 0.0004 | 0.0012 |
| 0.5hmax | 0.0009 | 0.0026 |
| 0.6hmax | 0.0018 | 0.0044 |
| 0.7hmax | 0.0032 | 0.0065 |
| 0.8hmax | 0.0048 | 0.0087 |
| 0.9hmax | 0.0052 | 0.0108 |
| 1.0hmax | −0.0007 | 0.0126 |

EXAMPLE 10

| | Wavelength = 405 nm NA = 0.85 | | | |
|---|---|---|---|---|
| Surface | Radius of Curvature | Curvature | Axial Distance | Refractive Index (405 nm) |
| 1* | 1.182 | 0.846 | 2.000 | 1.58598 |
| 2* | −3.171 | −0.315 | 0.601 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.72745 | 0.00000 |
| A4 | 1.84853E−02 | 2.98123E−01 |
| A6 | 3.10904E−03 | −2.74782E−01 |
| A8 | 4.56273E−03 | 1.38447E−01 |
| A10 | −1.08952E−03 | −2.93581E−02 |
| A12 | −2.09690E−05 | −1.66056E−03 |
| A14 | 5.60627E−04 | 1.10127E−03 |
| A16 | −1.61851E−04 | 0.00000E+00 |

| Value of Condition (1) | |
|---|---|
| r1/r2 | −0.3727 |

| Value of Condition (2) | |
|---|---|

-continued

Wavelength = 405 nm
NA = 0.85

| d/f | 1.1302 |
|---|---|

Value of Condition (3)

| r1/f | 0.6678 |
|---|---|

Value of Condition (4)

| r2/f | −1.7919 |
|---|---|

Value of Condition (5)

| θ1 − θ2 | 12.5894 |
|---|---|

Value of Condition (6)

| (n − 1)sinθ1 | 0.5486 |
|---|---|

Value of Condition (7)

| (r2 + r1)/(r2 − r1) | 0.4570 |
|---|---|

Value of Condition (8)

| WD/f | 0.3397 |
|---|---|

Value of Condition (9)

| dz(h)/dh − h/(r*SQRT(1 − (1 + k)*(h/r)^2)) | S1 | S2 |
|---|---|---|
| 0.0hmax | 0.0000 | 0.0000 |
| 0.1hmax | 0.0003 | 0.0015 |
| 0.2hmax | 0.0020 | 0.0112 |
| 0.3hmax | 0.0072 | 0.0348 |
| 0.4hmax | 0.0183 | 0.0738 |
| 0.5hmax | 0.0398 | 0.1250 |
| 0.6hmax | 0.0795 | 0.1822 |
| 0.7hmax | 0.1529 | 0.2392 |
| 0.8hmax | 0.2910 | 0.2918 |
| 0.9hmax | 0.5496 | 0.3401 |
| 1.0hmax | 0.9678 | 0.3853 |
| αmax − αmin | 0.9678 | 0.3853 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0003 |
| 0.3hmax | 0.0004 | 0.0017 |
| 0.4hmax | 0.0015 | 0.0049 |
| 0.5hmax | 0.0038 | 0.0109 |
| 0.6hmax | 0.0087 | 0.0202 |
| 0.7hmax | 0.0183 | 0.0331 |
| 0.8hmax | 0.0365 | 0.0493 |
| 0.9hmax | 0.0710 | 0.0685 |
| 1.0hmax | 0.1343 | 0.0906 |

EXAMPLE 11

Wavelength = 405 nm
NA = 0.85

| Surface | Radius of Curvature | Curvature | Axial Distance | Refractive Index (405 nm) |
|---|---|---|---|---|
| 1* | 1.406 | 0.711 | 1.900 | 1.79976 |
| 2* | −138.594 | −0.007 | 0.638 | |

-continued

Wavelength = 405 nm
NA = 0.85

| Surface | Radius of Curvature | Curvature | Axial Distance | Refractive Index (405 nm) |
|---|---|---|---|---|
| 3 | INFINITY | 0.000 | 0.100 | 1.62040 |
| 4 | INFINITY | 0.000 | | |

| Aspherical Coefficient | S1 | S2 |
|---|---|---|
| k | −0.82330 | 0.00000 |
| A4 | 1.92756E−02 | 1.20722E−01 |
| A6 | 1.08790E−03 | −1.87346E−01 |
| A8 | 3.94452E−03 | 9.49550E−02 |
| A10 | −2.44628E−03 | −1.88060E−02 |
| A12 | 2.77574E−05 | 0.00000E+00 |
| A14 | 6.18174E−04 | 0.00000E+00 |
| A16 | −2.51515E−04 | 0.00000E+00 |

Value of Condition (1)

| r1/r2 | −0.0101 |
|---|---|

Value of Condition (2)

| d/f | 1.0849 |
|---|---|

Value of Condition (3)

| r1/f | 0.8030 |
|---|---|

Value of Condition (4)

| r2/f | −79.1335 |
|---|---|

Value of Condition (5)

| θ1 − θ2 | −19.5308 |
|---|---|

Value of Condition (6)

| (n − 1)sinθ1 | 0.5798 |
|---|---|

Value of Condition (7)

| (r2 + r1)/(r2 − r1) | 0.9799 |
|---|---|

Value of Condition (8)

| WD/f | 0.3643 |
|---|---|

Value of Condition (9)

| dz(h)/dh − h/(r*SQRT(1 − (1 + k)*(h/r)^2)) | S1 | S2 |
|---|---|---|
| 0.0hmax | 0.0000 | 0.0000 |
| 0.1hmax | 0.0003 | 0.0006 |
| 0.2hmax | 0.0021 | 0.0046 |
| 0.3hmax | 0.0072 | 0.0132 |
| 0.4hmax | 0.0178 | 0.0248 |
| 0.5hmax | 0.0366 | 0.0344 |
| 0.6hmax | 0.0672 | 0.0351 |
| 0.7hmax | 0.1126 | 0.0206 |
| 0.8hmax | 0.1694 | −0.0124 |
| 0.9hmax | 0.1869 | −0.0629 |
| 1.0hmax | −0.1405 | −0.1289 |
| αmax − αmin | 0.3274 | 0.1640 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0001 |
| 0.3hmax | 0.0005 | 0.0007 |
| 0.4hmax | 0.0015 | 0.0019 |
| 0.5hmax | 0.0037 | 0.0037 |
| 0.6hmax | 0.0081 | 0.0060 |

-continued

Wavelength = 405 nm
NA = 0.85

| | | |
|---|---|---|
| 0.7hmax | 0.0157 | 0.0078 |
| 0.8hmax | 0.0277 | 0.0082 |
| 0.9hmax | 0.0438 | 0.0059 |
| 1.0hmax | 0.0507 | 0.0000 |

EXAMPLE 12

Wavelength = 405 nm
NA = 0.85

| Surface | Radius of Curvature | Curvature | Axial Distance | Refractive Index (405 nm) |
|---|---|---|---|---|
| 1* | 0.944 | 1.060 | 1.640 | 1.79976 |
| 2* | −228.376 | −0.004 | 0.207 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.59360 | 0.00000 |
| A4 | 3.63797E−02 | 2.13333E+00 |
| A6 | 2.01141E−02 | −1.14751E+01 |
| A8 | 1.44857E−02 | 2.79601E+01 |
| A10 | 6.72918E−03 | −5.31979E+00 |
| A12 | 2.91917E−04 | −7.09525E+01 |
| A14 | 3.50505E−03 | 1.09108E−01 |
| A16 | 1.31256E−03 | −5.90937E+00 |

Value of Condition (1)

| | |
|---|---|
| r1/r2 | −0.0041 |

Value of Condition (2)

| | |
|---|---|
| d/f | 1.3910 |

Value of Condition (3)

| | |
|---|---|
| r1/f | 0.8005 |

Value of Condition (4)

| | |
|---|---|
| r2/f | −193.7044 |

Value of Condition (5)

| | |
|---|---|
| θ1 − θ2 | 12.8018 |

Value of Condition (6)

| | |
|---|---|
| (n − 1)sinθ1 | 0.7124 |

Value of Condition (7)

| | |
|---|---|
| (r2 + r1)/(r2 − r1) | 0.9918 |

Value of Condition (8)

| | |
|---|---|
| WD/f | 0.1755 |

Value of Condition (9)

| dz(h)/dh − h/(r*SQRT(1 − (1 + k)*(h/r)^2)) | S1 | S2 |
|---|---|---|
| 0.0hmax | 0.0000 | 0.0000 |
| 0.1hmax | 0.0001 | 0.0004 |
| 0.2hmax | 0.0012 | 0.0032 |
| 0.3hmax | 0.0042 | 0.0102 |

-continued

Wavelength = 405 nm
NA = 0.85

| | | |
|---|---|---|
| 0.4hmax | 0.0108 | 0.0224 |
| 0.5hmax | 0.0230 | 0.0395 |
| 0.6hmax | 0.0448 | 0.0604 |
| 0.7hmax | 0.0831 | 0.0829 |
| 0.8hmax | 0.1511 | 0.1050 |
| 0.9hmax | 0.2767 | 0.1252 |
| 1.0hmax | 0.5230 | 0.1430 |
| αmax − αmin | 0.5230 | 0.1430 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0001 |
| 0.3hmax | 0.0003 | 0.0002 |
| 0.4hmax | 0.0009 | 0.0007 |
| 0.5hmax | 0.0022 | 0.0017 |
| 0.6hmax | 0.0050 | 0.0032 |
| 0.7hmax | 0.0103 | 0.0054 |
| 0.8hmax | 0.0200 | 0.0084 |
| 0.9hmax | 0.0375 | 0.0119 |
| 1.0hmax | 0.0702 | 0.0161 |

EXAMPLE 13

Wavelength = 405 nm
NA = 0.85

| Surface | Radius of Curvature | Curvature | Axial Distance | Refractive Index (405 nm) |
|---|---|---|---|---|
| 1* | 0.976 | 1.024 | 1.630 | 1.79976 |
| 2* | −6.893 | −0.145 | 0.242 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.63590 | 0.00000 |
| A4 | 3.57973E−02 | 1.48756E+00 |
| A6 | 8.99961E−03 | −8.61159E+00 |
| A8 | 3.05719E−02 | 1.96144E+01 |
| A10 | −2.38903E−02 | 0.00000E+00 |
| A12 | −1.13138E−02 | −4.04821E+00 |
| A14 | 4.55393E−02 | −4.05779E+02 |
| A16 | −3.11779E−02 | 9.06423E+02 |

Value of Condition (1)

| | |
|---|---|
| r1/r2 | −0.1416 |

Value of Condition (2)

| | |
|---|---|
| d/f | 1.3842 |

Value of Condition (3)

| | |
|---|---|
| r1/f | 0.8290 |

Value of Condition (4)

| | |
|---|---|
| r2/f | −5.8537 |

Value of Condition (5)

| | |
|---|---|
| θ1 − θ2 | −0.6971 |

Value of Condition (6)

-continued

| Wavelength = 405 nm NA = 0.85 | | |
|---|---|---|
| $(n-1)\sin\theta_1$ | | 0.6667 |
| Value of Condition (7) | | |
| $(r_2 + r_1)/(r_2 - r_1)$ | | 0.7519 |
| Value of Condition (8) | | |
| WD/f | | 0.2055 |
| Value of Condition (9) | | |
| $dz(h)/dh - h/(r*SQRT(1 - (1+k)*(h/r)^2))$ | S1 | S2 |
| 0.0hmax | 0.0000 | 0.0000 |
| 0.1hmax | 0.0001 | 0.0005 |
| 0.2hmax | 0.0012 | 0.0039 |
| 0.3hmax | 0.0040 | 0.0121 |
| 0.4hmax | 0.0101 | 0.0252 |
| 0.5hmax | 0.0210 | 0.0416 |
| 0.6hmax | 0.0397 | 0.0582 |
| 0.7hmax | 0.0698 | 0.0717 |
| 0.8hmax | 0.1161 | 0.0805 |
| 0.9hmax | 0.1774 | 0.0842 |
| 1.0hmax | 0.2058 | 0.0830 |
| $\alpha max - \alpha min$ | 0.2058 | 0.0842 |
| Value of Condition (10) | | |
| $\Delta(h)/f$ | S1 | S2 |
| 0.0hmax | 0.0000 | 0.0000 |
| 0.1hmax | 0.0000 | 0.0000 |
| 0.2hmax | 0.0000 | 0.0001 |
| 0.3hmax | 0.0003 | 0.0004 |
| 0.4hmax | 0.0008 | 0.0011 |
| 0.5hmax | 0.0021 | 0.0023 |
| 0.6hmax | 0.0046 | 0.0042 |
| 0.7hmax | 0.0092 | 0.0067 |
| 0.8hmax | 0.0169 | 0.0096 |
| 0.9hmax | 0.0293 | 0.0127 |
| 1.0hmax | 0.0463 | 0.0159 |

EXAMPLE 14

| Surface | Radius of Curvature | Curvature | Axial Distance | Refractive Index (405 nm) |
|---|---|---|---|---|
| 1* | 1.662 | 0.602 | 2.520 | 1.79976 |
| 2* | -4.983 | -0.201 | 0.550 | |
| 3 | INFINITY | 0.000 | 0.100 | 1.62040 |
| 4 | INFINITY | 0.000 | | |

Wavelength = 405 nm, NA = 0.80

| Aspherical Coefficient | S1 | S2 |
|---|---|---|
| k | -0.93917 | 0.00000 |
| A4 | 1.20736E-02 | 1.64394E-01 |
| A6 | 2.26426E-03 | -3.86037E-01 |
| A8 | -3.71101E-03 | 3.70083E-01 |
| A10 | 3.95061E-03 | -2.83734E-02 |
| A12 | -2.65101E-03 | -2.90003E-01 |
| A14 | 8.56739E-04 | 2.55789E-01 |
| A16 | -1.28429E-04 | -7.11354E-02 |

Value of Condition (1)

-continued

| Wavelength = 405 nm NA = 0.80 | | |
|---|---|---|
| $r_1/r_2$ | | -0.3336 |
| Value of Condition (2) | | |
| d/f | | 1.3443 |
| Value of Condition (3) | | |
| $r_1/f$ | | 0.8869 |
| Value of Condition (4) | | |
| $r_2/f$ | | -2.6581 |
| Value of Condition (5) | | |
| $\theta_1 - \theta_2$ | | -21.2959 |
| Value of Condition (6) | | |
| $(n-1)\sin\theta_1$ | | 0.5304 |
| Value of Condition (7) | | |
| $(r_2 + r_1)/(r_2 - r_1)$ | | 0.4996 |
| Value of Condition (8) | | |
| WD/f | | 0.2936 |
| Value of Condition (9) | | |
| $dz(h)/dh - h/(r*SQRT(1 - (1+k)*(h/r)^2))$ | S1 | S2 |
| 0.0hmax | 0.0000 | 0.0000 |
| 0.1hmax | 0.0002 | 0.0004 |
| 0.2hmax | 0.0013 | 0.0031 |
| 0.3hmax | 0.0046 | 0.0092 |
| 0.4hmax | 0.0110 | 0.0178 |
| 0.5hmax | 0.0215 | 0.0264 |
| 0.6hmax | 0.0370 | 0.0322 |
| 0.7hmax | 0.0567 | 0.0333 |
| 0.8hmax | 0.0750 | 0.0293 |
| 0.9hmax | 0.0701 | 0.0204 |
| 1.0hmax | -0.0395 | 0.0068 |
| $\alpha max - \alpha min$ | 0.1145 | 0.0333 |
| Value of Condition (10) | | |
| $\Delta(h)/f$ | S1 | S2 |
| 0.0hmax | 0.0000 | 0.0000 |
| 0.1hmax | 0.0000 | 0.0000 |
| 0.2hmax | 0.0001 | 0.0001 |
| 0.3hmax | 0.0003 | 0.0003 |
| 0.4hmax | 0.0009 | 0.0010 |
| 0.5hmax | 0.0021 | 0.0020 |
| 0.6hmax | 0.0044 | 0.0034 |
| 0.7hmax | 0.0082 | 0.0049 |
| 0.8hmax | 0.0135 | 0.0064 |
| 0.9hmax | 0.0196 | 0.0076 |
| 1.0hmax | 0.0221 | 0.0082 |

EXAMPLE 15

| | Wavelength = 405 nm | | | |
| | NA = 0.85 | | | |
| Surface | Radius of Curvature | Curvature | Axial Distance | Refractive Index (405 nm) |
|---|---|---|---|---|
| 1* | 1.180 | 0.848 | 2.000 | 1.58598 |
| 2* | −3.395 | −0.295 | 0.604 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.72492 | 0.00000 |
| A4 | 1.88730E−02 | 2.83223E−01 |
| A6 | 2.83240E−03 | −2.68840E−01 |
| A8 | 4.67178E−03 | 1.43521E−01 |
| A10 | −9.50430E−04 | −3.09805E−02 |
| A12 | −1.39800E−04 | −4.89917E−03 |
| A14 | 5.23460E−04 | 2.64576E−03 |
| A16 | −1.31473E−04 | 0.00000E−00 |

| Value of Condition (1) | |
|---|---|
| r1/r2 | −0.3475 |

| Value of Condition (2) | |
|---|---|
| d/f | 1.1224 |

| Value of Condition (3) | |
|---|---|
| r1/f | 0.6621 |

| Value of Condition (4) | |
|---|---|
| r2/f | −1.9051 |

| Value of Condition (5) | |
|---|---|
| θ1 − θ2 | 13.5289 |

| Value of Condition (6) | |
|---|---|
| (n − 1)sinθ1 | 0.5501 |

| Value of Condition (7) | |
|---|---|
| (r2 + r1)/(r2 − r1) | 0.4842 |

| Value of Condition (8) | |
|---|---|
| WD/f | 0.3388 |

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0003 | 0.0014 |
| 0.2hmax | 0.0021 | 0.0105 |
| 0.3hmax | 0.0073 | 0.0327 |
| 0.4hmax | 0.0186 | 0.0692 |
| 0.5hmax | 0.0402 | 0.1170 |
| 0.6hmax | 0.0802 | 0.1706 |
| 0.7hmax | 0.1535 | 0.2245 |
| 0.8hmax | 0.2912 | 0.2752 |

-continued

| | Wavelength = 405 nm | |
| | NA = 0.85 | |
|---|---|---|
| 0.9hmax | 0.5532 | 0.3224 |
| 1.0hmax | 1.0170 | 0.3668 |
| αmax − αmin | 1.0170 | 0.3668 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0003 |
| 0.3hmax | 0.0005 | 0.0016 |
| 0.4hmax | 0.0015 | 0.0046 |
| 0.5hmax | 0.0039 | 0.0101 |
| 0.6hmax | 0.0088 | 0.0188 |
| 0.7hmax | 0.0183 | 0.0307 |
| 0.8hmax | 0.0364 | 0.0458 |
| 0.9hmax | 0.0708 | 0.0638 |
| 1.0hmax | 0.1353 | 0.0846 |

EXAMPLE 16

| | Wavelength = 405 nm | | | |
| | NA = 0.80 | | | |
| Surface | Radius of Curvature | Curvature | Axial Distance | Refractive Index (405 nm) |
|---|---|---|---|---|
| 1* | 1.586 | 1.630 | 2.050 | 1.79976 |
| 2* | −10.862 | −0.092 | 0.733 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.98704 | 0.00000 |
| A4 | 1.54425E−02 | 5.22497E−02 |
| A6 | −6.43927E−04 | −1.00415E−01 |
| A8 | 1.30792E−03 | 4.97413E−02 |
| A10 | −1.23297E−03 | −9.34286E−03 |
| A12 | −8.25996E−05 | 0.00000E+00 |
| A14 | 2.49523E−04 | 0.00000E+00 |
| A16 | −1.07434E−04 | 0.00000E+00 |

| Value of Condition (1) | |
|---|---|
| r1/r2 | −0.1460 |

| Value of Condition (2) | |
|---|---|
| d/f | 1.0979 |

| Value of Condition (3) | |
|---|---|
| r1/f | 0.8495 |

| Value of Condition (4) | |
|---|---|
| r2/f | −5.8174 |

| Value of Condition (5) | |
|---|---|
| θ1 − θ2 | −34.1816 |

| Value of Condition (6) | |
|---|---|
| (n − 1)sinθ1 | 0.4481 |

Value of Condition (7)

-continued

| Wavelength = 405 nm NA = 0.80 | |
|---|---|
| (r2 + r1)/(r2 − r1) | 0.7452 |

Value of Condition (8)

| WD/f | 0.3925 |
|---|---|

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0002 | 0.0003 |
| 0.2hmax | 0.0017 | 0.0022 |
| 0.3hmax | 0.0056 | 0.0059 |
| 0.4hmax | 0.0132 | 0.0096 |
| 0.5hmax | 0.0256 | 0.0095 |
| 0.6hmax | 0.0432 | 0.0008 |
| 0.7hmax | 0.0635 | −0.0207 |
| 0.8hmax | 0.0745 | −0.0564 |
| 0.9hmax | 0.0275 | −0.1048 |
| 1.0hmax | −0.2747 | −0.1640 |
| αmax − αmin | 0.3492 | 0.1736 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0001 |
| 0.3hmax | 0.0003 | 0.0003 |
| 0.4hmax | 0.0011 | 0.0008 |
| 0.5hmax | 0.0026 | 0.0014 |
| 0.6hmax | 0.0053 | 0.0018 |
| 0.7hmax | 0.0096 | 0.0012 |
| 0.8hmax | 0.0153 | −0.0011 |
| 0.9hmax | 0.0201 | −0.0060 |
| 1.0hmax | 0.0133 | −0.0142 |

EXAMPLE 17

| | Wavelength = 405 nm NA = 0.83 | | | |
|---|---|---|---|---|
| Surface | Radius of Curvature | Curvature | Axial Distance | Refractive Index (405 nm) |
| 1* | 1.283 | 0.780 | 2.200 | 1.64234 |
| 2* | −4.118 | −0.243 | 0.535 | |
| 3 | INFINITY | 0.000 | 0.100 | 1.62040 |
| 4 | INFINITY | 0.000 | | |

| Aspherical Coefficient | S1 | S2 |
|---|---|---|
| k | −0.73077 | 0.00000 |
| A4 | 1.64454E−02 | 3.23861E−01 |
| A6 | 3.92864E−03 | −3.64017E−01 |
| A8 | 1.24339E−03 | 1.71396E−01 |
| A10 | 3.63835E−04 | 2.44836E−03 |
| A12 | −2.81823E−04 | −1.01594E−02 |
| A14 | 2.89278E−04 | −9.44670E−03 |
| A16 | −8.21544E−05 | 0.00000E+00 |

Value of Condition (1)

| r1/r2 | −0.3115 |
|---|---|

Value of Condition (2)

-continued

| Wavelength = 405 nm NA = 0.83 | |
|---|---|
| d/f | 1.2147 |

Value of Condition (3)

| r1/f | 0.7082 |
|---|---|

Value of Condition (4)

| r2/f | −2.2738 |
|---|---|

Value of Condition (5)

| θ1 − θ2 | 9.8699 |
|---|---|

Value of Condition (6)

| (n − 1)sinθ1 | 0.5801 |
|---|---|

Value of Condition (7)

| (r2 + r1)/(r2 − r1) | 0.5250 |
|---|---|

Value of Condition (8)

| WD/f | 0.2951 |
|---|---|

Value of Condition (9)

| dz(h)/dh − h/ (r*SQRT(1 − (1 + k)*(h/r)^2)) | S1 | S2 |
|---|---|---|
| 0.0hmax | 0.0000 | 0.0000 |
| 0.1hmax | 0.0002 | 0.0008 |
| 0.2hmax | 0.0018 | 0.0065 |
| 0.3hmax | 0.0065 | 0.0207 |
| 0.4hmax | 0.0163 | 0.0446 |
| 0.5hmax | 0.0349 | 0.0771 |
| 0.6hmax | 0.0677 | 0.1146 |
| 0.7hmax | 0.1250 | 0.1525 |
| 0.8hmax | 0.2247 | 0.1867 |
| 0.9hmax | 0.3931 | 0.2161 |
| 1.0hmax | 0.6309 | 0.2413 |
| αmax − αmin | 0.6309 | 0.2413 |

Value of Condition (10)

| Δ (h)/f | S1 | S2 |
|---|---|---|
| 0.0hmax | 0.0000 | 0.0000 |
| 0.1hmax | 0.0000 | 0.0000 |
| 0.2hmax | 0.0001 | 0.0002 |
| 0.3hmax | 0.0004 | 0.0008 |
| 0.4hmax | 0.0013 | 0.0023 |
| 0.5hmax | 0.0033 | 0.0052 |
| 0.6hmax | 0.0075 | 0.0098 |
| 0.7hmax | 0.0152 | 0.0163 |
| 0.8hmax | 0.0293 | 0.0244 |
| 0.9hmax | 0.0543 | 0.0342 |
| 1.0hmax | 0.0965 | 0.0452 |

EXAMPLE 18

| | Wavelength = 405 nm NA = 0.85 | | | |
|---|---|---|---|---|
| Surface | Radius of Curvature | Curvature | Axial Distance | Refractive Index (405 nm) |
| 1* | 0.943 | 1.061 | 1.466 | 1.79976 |
| 2 | −200.298 | −0.005 | 0.304 | |

-continued

Wavelength = 405 nm
NA = 0.85

| 3 | INFINITY | 0.000 | 0.100 | 1.62040 |
|---|----------|-------|-------|---------|
| 4 | INFINITY | 0.000 |       |         |

| Aspherical Coefficient | S1 | S2 |
|---|---|---|
| k   | -2.68485     | 0.00000     |
| A4  | 3.20438E-01  | 0.00000E+00 |
| A6  | -1.00099E-01 | 0.00000E+00 |
| A8  | -1.60101E-01 | 0.00000E+00 |
| A10 | 5.77481E-01  | 0.00000E+00 |
| A12 | -7.42983E-01 | 0.00000E+00 |
| A14 | 4.49067E-01  | 0.00000E+00 |
| A16 | -1.08058E-02 | 0.00000E+00 |

Value of Condition (1)

| r1/r2 | -0.0047 |
|---|---|

Value of Condition (2)

| d/f | 1.2454 |
|---|---|

Value of Condition (3)

| r1/f | 0.8009 |
|---|---|

Value of Condition (4)

| r2/f | -170.1640 |
|---|---|

Value of Condition (5)

| $\theta 1 - \theta 2$ | -3.1350 |
|---|---|

Value of Condition (6)

| $(n - 1)\sin\theta 1$ | 0.6570 |
|---|---|

Value of Condition (7)

| (r2 + r1)/(r2 - r1) | 0.9906 |
|---|---|

Value of Condition (8)

| WD/f | 0.2582 |
|---|---|

Value of Condition (9)

| dz(h)/dh - h/ (r*SQRT(1 - (1 + k)*(h/r)^2)) | S1 | S2 |
|---|---|---|
| 0.0hmax | 0.0000 | 0.0000 |
| 0.1hmax | 0.0013 | 0.0000 |
| 0.2hmax | 0.0100 | 0.0000 |
| 0.3hmax | 0.0330 | 0.0000 |
| 0.4hmax | 0.0750 | 0.0000 |
| 0.5hmax | 0.1391 | 0.0000 |
| 0.6hmax | 0.2276 | 0.0000 |
| 0.7hmax | 0.3427 | 0.0000 |
| 0.8hmax | 0.4849 | 0.0000 |
| 0.9hmax | 0.6486 | 0.0000 |
| 1.0hmax | 0.8174 | 0.0000 |
| $\alpha$max - $\alpha$min | 0.8174 | 0.0000 |

Value of Condition (10)

| $\Delta$ (h)/f | S1 | S2 |
|---|---|---|
| 0.0hmax | 0.0000 | 0.0000 |
| 0.1hmax | 0.0000 | 0.0000 |
| 0.2hmax | 0.0004 | 0.0000 |
| 0.3hmax | 0.0021 | 0.0000 |
| 0.4hmax | 0.0066 | 0.0000 |
| 0.5hmax | 0.0155 | 0.0000 |
| 0.6hmax | 0.0309 | 0.0000 |
| 0.7hmax | 0.0549 | 0.0000 |
| 0.8hmax | 0.0899 | 0.0000 |
| 0.9hmax | 0.1379 | 0.0000 |
| 1.0hmax | 0.2003 | 0.0000 |

Figure 19:
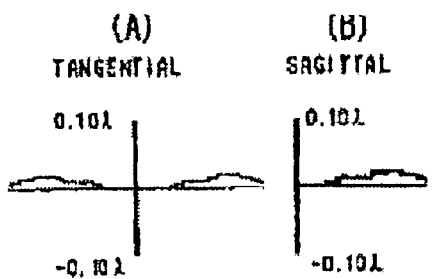
FIGS. 19(A) and 19(B) are graphic representations of aberrations of the first embodiment.
Figure 20:
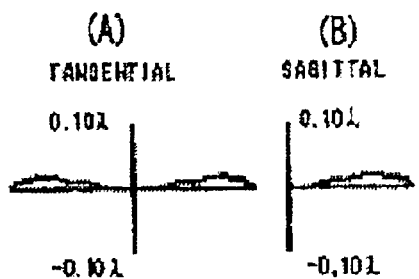
FIGS. 20(A) and 20(B) are graphic representations of aberrations of the second embodiment.
Figure 21:
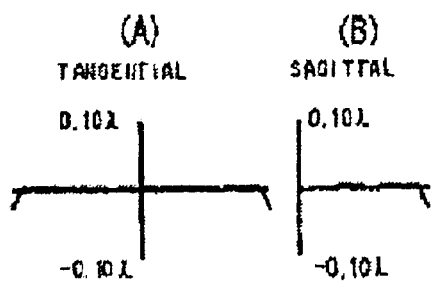
FIGS. 21(A) and 21(B) are graphic representations of aberrations of the third embodiment.
Figure 22:
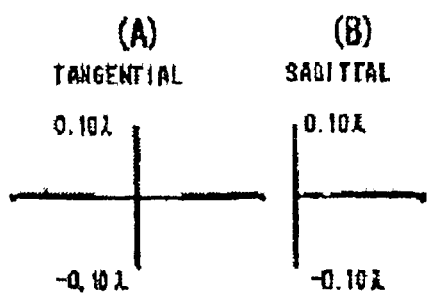
FIGS. 22(A) and 22(B) are graphic representations of aberrations of the fourth embodiment.
Figure 23:
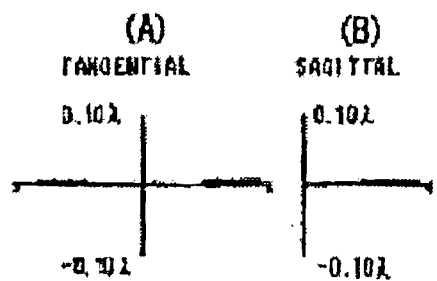
FIGS. 23(A) and 23(B) are graphic representations of aberrations of the fifth embodiment.
Figure 24:
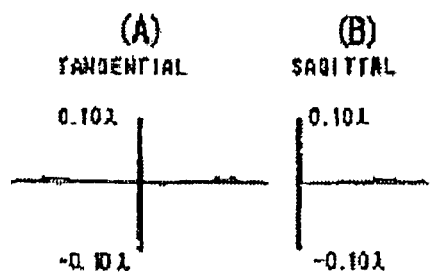
FIGS. 24(A) and 24(B) are graphic representations of aberrations of the sixth embodiment.
Figure 25:
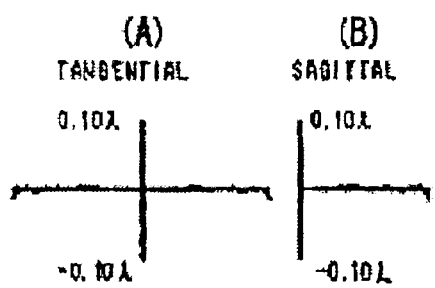
FIGS. 25(A) and 25(B) are graphic representations of aberrations of the seventh embodiment.
Figure 26:
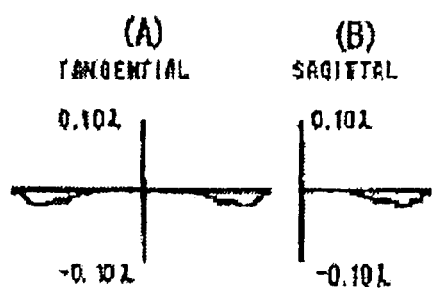
FIGS. 26(A) and 26(B) are graphic representations of aberrations of the eighth embodiment.
Figure 27:
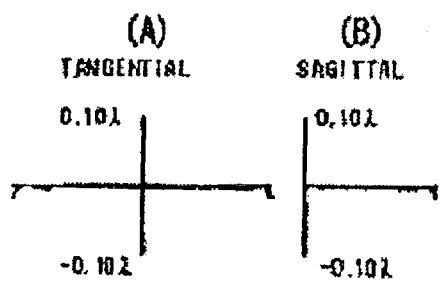
FIGS. 27(A) and 27(B) are graphic representations of aberrations of the ninth embodiment.
Figure 28:
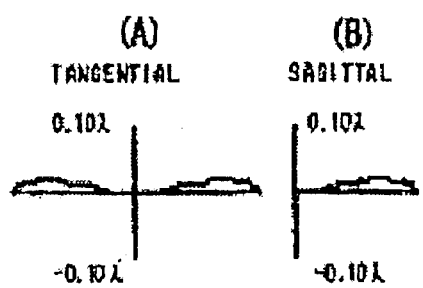
FIGS. 28(A) and 28(B) are graphic representations of aberrations of the tenth embodiment.
Figure 29:
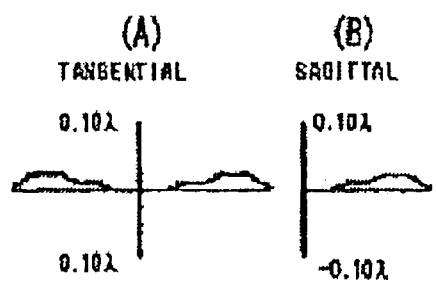
FIGS. 29(A) and 29(B) are graphic representations of aberrations of the eleventh embodiment.
Figure 30:
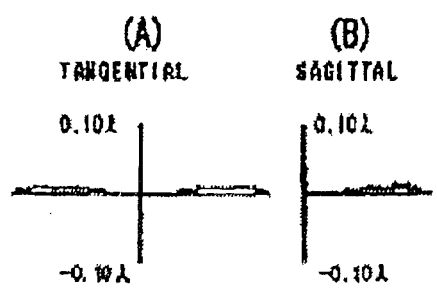
FIGS. 30(A) and 30(B) are graphic representations of aberrations of the twelfth embodiment.
Figure 31:
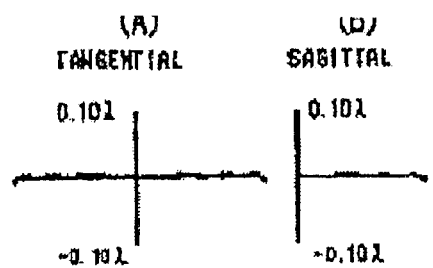
FIGS. 31(A) and 31(B) are graphic representations of aberrations of the thirteenth embodiment.
Figure 32:
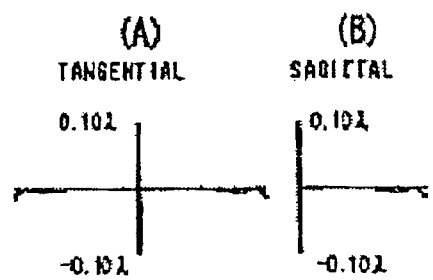
FIGS. 32(A) and 32(B) are graphic representations of aberrations of the fourteenth embodiment.
Figure 33:
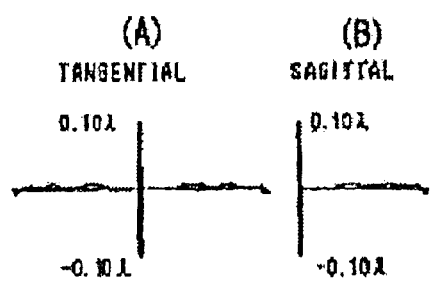
FIGS. 33(A) and 33(B) are graphic representations of aberrations of the fifteenth embodiment.
Figure 34:
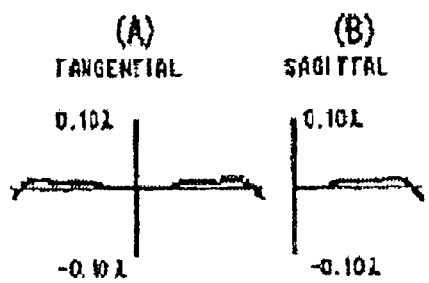
FIGS. 34(A) and 34(B) are graphic representations of aberrations of the sixteenth embodiment.
Figure 35:
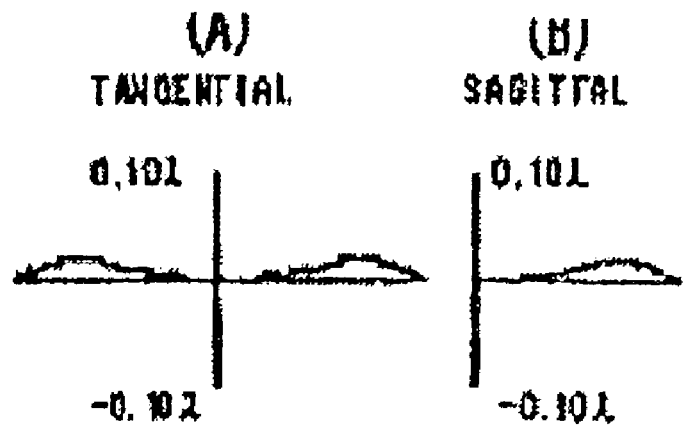
FIGS. 35(A) and 35(B) are graphic representations of aberrations of the seventeenth embodiment.
Figure 36:
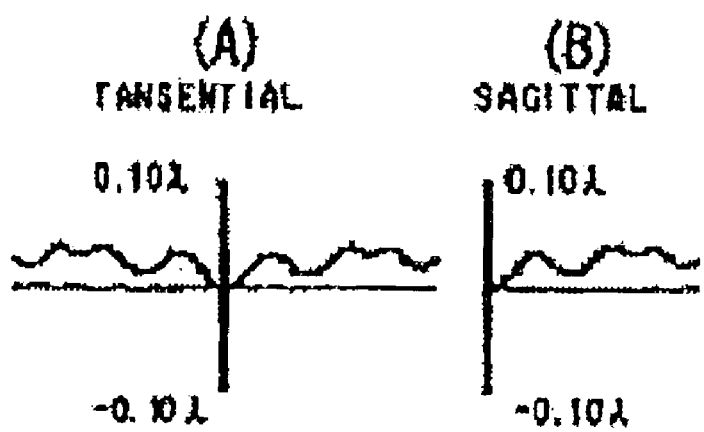
FIGS. 36(A) and 36(B) are graphic representations of aberrations of the eighteenth embodiment.

FIGS. 19(A) and 19(B) through 36(A) and 36(B) are graphic representations of aberrations of the first to the eighteenth embodiments. FIGS. 19(A), 20(A), 21(A), 22(A), 23(A), 24(A), 25(A), 26(A), 27(A), 28(A), 29(A), 30(A), 31(A), 32(A), 33(A), 34(A), 35(A) and 36(A) each show the wavefront aberration (TANGENTIAL) at the tangential luminous flux. FIGS. 19(B), 20(B), 21(B), 22(B), 23(B), 24(B), 25(B), 26(B), 27(B), 28(B), 29(B), 30(B), 31(B), 32(B), 33(B), 34(B), 35(B) and 36(B) each show the wavefront aberration (SAGITTAL) at the sagittal luminous flux ($\lambda$=405 nm). Since the wavefront aberration is important for objective lens systems for optical pickups, the wavefront aberration at an image height of 0 is shown in each graphic representation of aberrations.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An objective lens system for optical pickups reading and/or writing information by condensing a luminous flux from a light source onto an optical information recording medium, consisting of:

a single lens having, from a light source side, a first surface convex to the light source side and a second surface convex to an image side, a medium of the single lens being a homogeneous medium, at least one of the two surfaces being aspherical, and wherein the following conditions are satisfied:

$-0.45 < r1/r2 < -0.1803$ $1.05 < d/f < 1.4$ $-40 < \theta 1 - \theta 2 < 20$ where r1 is the radius of curvature of the first surface;

r2 is the radius of curvature of the second surface;

d is the axial thickness of the single lens;

f is the focal length of the single lens, $\theta 1$ is the angle (°) which the ray incident on the margin of the effective diameter of the first surface forms with the first surface; and $\theta 2$ is the angle (°) which the ray exiting from the margin of the effective diameter of the second surface forms with the second surface.

2. An objective lens system for optical pickups reading and/or writing information by condensing a luminous flux from a light source onto an optical information recording medium, consisting of:

a single lens having, from a light source side, a first surface convex to the light source side and a second surface convex to an image side, a medium of the single lens being a homogeneous medium, at least one of the two surfaces being aspherical, and wherein the following conditions are satisfied:

$$-0.45 < r1/r2 \leq -0.1803$$

$$1.05 < d/f < 1.4$$

$$0.35 < (n-1)\sin\theta 1 < 0.8$$

where r1 is the radius of curvature of the first surface;

r2 is the radius of curvature of the second surface;

d is the axial thickness of the single lens;

f is the focal length of the single lens;

n is the refractive index of the single lens in the wavelength used; and $\theta 1$ is the angle (°) which the ray incident on the margin of the effective diameter of the first surface forms with the first surface.

3. An objective lens system for optical pickups reading and/or writing information by condensing a luminous flux from a light source onto an optical information recording medium, comprising:

a single lens having, from a light source side, a first surface convex to the light source side and a second source surface convex to an image side, a medium of the single lens being a homogenous medium, at least one the two surfaces being aspherical, and wherein the following conditions are satisfied:

$$-0.45 < r1/r2 \leq -0.1803$$

$$0.35 < d/f < 1.4$$

$$-40 < \theta 1 \cdot \theta 2 < 20$$

where r1 is the radius of curvature of the first surface;

r2 is the radius of curvature of the second surface;

d is the axial thickness of the single lens;

f is the focal length of the single lens;

$\theta 1$ is the angle (°) which the ray incident on the margin of the effective diameter of the first surface forms with the first surface; and $\theta 2$ is the angle (°) which the ray exiting from the margin of the effective diameter of the second surface forms with the second surface.

4. An objective lens system as claimed in claim 3, wherein the following condition is satisfied:

$$0.6 < r1/f < 0.95$$

where r1 is the radius of curvature of the first surface; and f is the focal length of the first lens.

5. An objective lens system as claimed in claim 3, wherein the following condition is satisfied:

$$-300 < r2/f < -1.5$$

where r2 is the radius of curvature of the second surface; and f is the focal length of the single lens.

6. An objective lens system as claimed in claim 3, wherein the following condition is satisfied:

$$0.3 < (r2+r1)/(r2-r1) < 1.0$$

where r1 is the radius of curvature of the first surface; and r2 is the radius of curvature of the second surface.

7. An objective lens system as claimed in claim 6, wherein the following conditions is satisfied:

$$0.3 < (r2+r1)/(r2 \cdot r1) < 0.525.$$

8. An objective lens system as claimed in claim 7, wherein the following condition is satisfied:

$$NA < 0.8$$

where

NA is the numerical aperture of the single lens.

9. An objective lens system as claimed in claim 3, the first surface is an aspherical surface.

10. An objective lens system as claimed in claim 9, the following condition is satisfied:

$$-0.01 < \Delta(h\max)/f < 0.3$$

where $\Delta(h)$ is the difference between the distance z(h) from the vertex of the aspherical surface along the optical axis and the distance from the vertex of a reference quadratic curve $[=r-\{r^2-(1+k)\cdot h^2\}^{1/2}]$ along the optical axis at a height h from the optical axis;

h is the incident height, from the optical axis, of the axial ray incident on the aspherical surface;

hmax is the incident height, from the optical axis, of the axial marginal ray incident on the aspherical surface;

z(h) is the aspherical configuration (the distance from the vertex of the aspherical surface along the optical axis at each height h);

$$z(h) = r - \{r^2 - (1+k)\cdot h^2\}^{1/2} + (A4\cdot h^4 + A6\cdot h^6 + A8\cdot h^8 + \ldots)$$

r is the paraxial radius of curvature of the aspherical surface;

k is the conic constant;

Ai is the i-th aspherical coefficient of h; and f is the focal length of the objective lens system.

11. An objective lens system as claimed in claim 9, wherein the following condition is satisfied:

$$0.08 < \alpha\max - \alpha\min < 1.0$$

where $\alpha$ max is the maximum value of $\alpha$ (h) at $0 \leq h \leq h\max$;

$\alpha$ min is the minimum value of $\alpha$ (h) at $0 \leq h \leq h\max$;

$\alpha(h) = dz(h)/dh - h/[r\cdot\{1-(1+k)\cdot(h/r)^2\}^{1/2}]$ h is the incident height, from the optical axis, of the axial ray incident on the aspherical surface;

hmax is the incident height, from the optical axis, of the axial marginal ray incident on the aspherical surface;

z(h) is the aspherical surface configuration (the distance from the vertex of the aspherical surface along the optical axis at each height h);

$$z(h) = r - \{r^2 - (1+k)\cdot h^2\}^{1/2} + (A4\cdot h^4 + A6\cdot h^6 + A8\cdot h^8 + \ldots)$$

r is the paraxial radius of curvature of the aspherical surface;

k is the conic constant;

Ai is the i-th aspherical coefficient of h; and dz(h)/dh is the differential value with respect to the incident height h of the aspherical surface configuration.

12. An objective lens system as claimed in claim 9, the following condition is satisfied:

$$0.15 < WD/f < 0.5$$

where

WD is the working distance; and f is the focal length of the single lens.

13. An objective lens system as claimed in claim 12, wherein the following condition is satisfied:

$$-4.6603 < r2/f < -1.5$$

$$0.2284 < WD/f < 0.5.$$

14. An objective lens system as claimed in claim 13, wherein the following condition is satisfied:

$$NA < 0.8$$

where

NA is the numerical aperture of the single lens.

15. An objective lens system as claimed in claim 3, the second surface is an aspherical surface.

16. An objective lens system as claimed in claim 15, the following condition is satisfied:

$$0.01 < \alpha max - \alpha min < 0.5$$

where $\alpha$ max is the maximum value of $\alpha$ (h) at $0 \leq h \leq hmax$;

$\alpha$ min is the minimum value of $\alpha$ (h) at $0 \leq h \leq hmax$;

$\alpha$ (h)$\equiv$dz(h)/dh$-$h/[r·$\{1-(1+k)\cdot(h/r)^2\}^{1/2}$]

h is the incident height, from the optical axis, of the axial ray incident on the aspherical surface;

hmax is the incident height, from the optical axis, of the axial marginal ray incident on the aspherical surface;

z(h) is the aspherical surface configuration (the distance from the vertex of the aspherical surface along the optical axis at each height h);

$$z(h) = r - \{r^2 - (1+k)\cdot h^2\}^{1/2} + (A4\cdot h^4 + A6\cdot h^6 + A8\cdot h^8 + \ldots)$$

r is the paraxial radius of curvature of the aspherical surface;

k is the conic constant;

Ai is the i-th aspherical coefficient of h; and dz(h)/dh is the differential value with respect to the incident height h of the aspherical surface configuration.

17. An objective lens system as claimed in claim 15, the following condition is satisfied:

$$-0.01 < \Delta(h max)/f < 0.1$$

where $\Delta$(h) is the difference between the distance z(h) from the vertex of the aspherical surface along the optical axis and the distance from the vertex of a reference quadratic curve [$\equiv r - \{r^2 - (1+k)\cdot h^2\}^{1/2}$] along the optical axis at a height h from the optical axis;

h is the incident height, from the optical axis, of the axial ray incident on the aspherical surface;

hmax is the incident height, from the optical axis, of the axial marginal ray incident on the aspherical surface;

z(h) is the aspherical configuration (the distance from the vertex of the aspherical surface along the optical axis at each height h);

$$z(h) = r - \{r^2 - (1+k)\cdot h^2\}^{1/2} + (A4\cdot h^4 + A6\cdot h^6 + A8\cdot h^8 + \ldots)$$

r is the paraxial radius of curvature of the aspherical surface;

k is the conic constant;

Ai is the i-th aspherical coefficient of h; and f is the focal length of the objective lens system.

18. An optical information recorder comprising:

an optical pickup having the objective lens system having a construction of claim3.

19. An objective lens system as claimed in claim 3, wherein an object distance of the system is infinity.

20. An objective lens system as claimed in claim 3, wherein the following condition is satisfied, $$n \leq 1.64234$$

where n is a refractive index of the single lens.

21. An objective lens system as claimed in claim 3, wherein the following condition is satisfied:

$$1.05 < d/f < 1.35.$$

22. An objective lens system as claimed in claim 21, wherein the following condition is satisfied:

$$0.6 \leq r1/f < 0.8869.$$

23. An objective lens system as claimed in claim 3, wherein the following condition is satisfied:

$$NA \geq 0.8$$

where

NA is the numerical aperture of the single lens.

24. An objective lens system for optical pickups reading and/or writing information by condensing a luminous flux from a light source onto an optical information recording medium, comprising:

a single lens having, from a light source side, a first surface convex to the light source side and a second surface convex to an image side, a medium of the single lens being a homogeneous medium, at least one of the two surfaces being aspherical, and wherein the following conditions are satisfied:

$$0.45 < r1/r2 \leq -0.1803$$

$$1.05 < d/f < 1.4$$

$$0.35 < (n-1)\sin\theta1 < 0.8$$

where r1 is the radius of curvature of the first surface;

r2 is the radius of curvature of the second surface;

d is the axial thickness of the single lens;

f is the focal length of the single lens;

n is the refractive index of the single lens in the wavelength used; and

θ1 is the angle (°) which the ray incident on the margin of the effective diameter of the first surface forms with the first surface.

25. An objective lens system as claimed in claim 24, wherein the following condition is satisfied:

$$0.3 < (r2+r1)/(r2-r1) < 1.0$$

where r1 is the radius of curvature of the first surface; and r2 is the radius of curvature of the second surface.

26. An objective lens system as claimed in claim 25, wherein the following condition is satisfied:

$$0.3 < (r2+r1)/(r2 \cdot r1) \leq 0.525.$$

27. An objective lens system as claimed in claim 26, wherein the following condition is satisfied:

$$NA > 0.8$$

where

NA is the numerical aperture of the single lens.

28. An objective lens system as claimed in claim 24, the first surface (s1) is an aspherical surface.

29. An objective lens system as claimed in claim 28, the following condition is satisfied:

$$0.08 < \alpha\,\text{max} - \alpha\,\text{min} < 1.0$$

where

α max is the maximum value of α (h) at 0≦h≦hmax;

α min is the minimum value of α (h) at 0≦h≦hmax;

$\alpha(h) \equiv dz(h)/dh - h/[r \cdot \{1-(1+k)\cdot(h/r)^2\}^{1/2}]$ h is the incident height, from the optical axis, of the axial ray incident on the aspherical surface;

hmax is the incident height, from the optical axis, of the axial marginal ray incident on the aspherical surface;

z(h) is the aspherical surface configuration (the distance from the vertex of the aspherical surface along the optical axis at each height h);

$$z(h) = r - \{r^2 - (1+k)\cdot h^2\}^{1/2} + (A4 \cdot h^4 + A6 \cdot h^6 + A8 \cdot h^8 + \ldots)$$

r is the paraxial radius of curvature of the aspherical surface;

k is the conic constant;

Ai is the i-th aspherical coefficient of h; and dz(h)/dh is the differential value with respect to the incident height h of the aspherical surface configuration.

30. An objective lens system as claimed in claim 28, the following condition is satisfied:

$$-0.01 < \Delta(h\text{max})/f < 0.3$$

where

Δ(h) is the difference between the distance z(h) from the vertex of the aspherical surface along the optical axis and the distance from the vertex of a reference quadratic curve $[\equiv r - \{r^2-(1+k)\cdot h^2\}^{1/2}]$ along the optical axis at a height h from the optical axis;

h is the incident height, from the optical axis, of the axial ray incident on the aspherical surface;

hmax is the incident height, from the optical axis, of the axial marginal ray incident on the aspherical surface;

z(h) is the aspherical configuration (the distance from the vertex of the aspherical surface along the optical axis at each height h);

$$z(h) = r - \{r^2 - (1+k)\cdot h^2\}^{1/2} + (A4 \cdot h^4 + A6 \cdot h^6 + A8 \cdot h^8 + \ldots)$$

r is the paraxial radius of curvature of the aspherical surface;

k is the conic constant;

Ai is the i-th aspherical coefficient of h; and f is the focal length of the objective lens system.

31. An objective lens system as claimed in claim 28, the following condition is satisfied:

$$0.15 < WD/f < 0.5$$

where

WD is the working distance; and f is the focal length of the single lens.

32. An objective lens system as claimed in claim 31, wherein the following condition is satisfied:

$$-4.6603 \leq r2/f < 1.5$$

$$0.2284 \leq WD/f < 0.5$$

33. An objective lens system as claimed in claim 32, wherein the following condition is satisfied:

$$NA \geq 0.8$$

where

NA is the numerical aperture of the single lens.

34. An objective lens system as claimed in claim 24, wherein the second surface is an aspherical surface.

35. An objective lens system as claimed in claim 34, the following condition is satisfied:

$$0.01 < \alpha\,\text{max} - \alpha\,\text{min} < 0.5$$

where

α max is the maximum value of α (h) at 0≦h≦hmax;

α min is the minimum value of α (h) at 0≦h≦hmax;

$\alpha(h) \equiv dz(h)/dh - h/[r \cdot \{1-(1+k)\cdot(h/r)^2\}^{1/2}]$ h is the incident height, from the optical axis, of the axial ray incident on the aspherical surface;

hmax is the incident height, from the optical axis, of the axial marginal ray incident on the aspherical surface;

z(h) is the aspherical surface configuration (the distance from the vertex of the aspherical surface along the optical axis at each height h);

$$z(h) = r - \{r^2 - (1+k)\cdot h^2\}^{1/2} + (A4 \cdot h^4 + A6 \cdot h^6 + A8 \cdot h^8 + \ldots)$$

r is the paraxial radius of curvature of the aspherical surface;

k is the conic constant;

Ai is the i-th aspherical coefficient of h; and dz(h)/dh is the differential value with respect to the incident height h of the aspherical surface configuration.

36. An objective lens system as claimed in claim 34, the following condition is satisfied:

$$-0.01 < \Delta(h\max)/f < 0.1$$

where

Δ(h) is the difference between the distance z(h) from the vertex of the aspherical surface along the optical axis and the distance from the vertex of a reference quadratic curve $[\equiv r-\{r^2-(1+k)\cdot h^2\}^{1/2}]$ along the optical axis at a height h from the optical axis;

h is the incident height, from the optical axis, of the axial ray incident on the aspherical surface;

hmax is the incident height, from the optical axis, of the axial marginal ray incident on the aspherical surface;

z(h) is the aspherical configuration (the distance from the vertex of the aspherical surface along the optical axis at each height h);

$$z(h) = r - \{r^2-(1+k)\cdot h^2\}^{1/2} + (A4\cdot h^4 + A6\cdot h^6 + A8\cdot h^8 + \ldots)$$

r is the paraxial radius of curvature of the aspherical surface;

k is the conic constant;

Ai is the i-th aspherical coefficient of h; and f is the focal length of the objective lens system.

37. An objective lens system as claimed in claim 24, wherein an object distance of the system is infinity.

38. An objective lens system as claimed in claim 24, wherein the following condition is satisfied:

$$n \leq 1.64234$$

where n is a refractive index of the single lens.

39. An objective lens system as claimed in claim 24, wherein the following condition is satisfied:

$$1.05 < d/f < 1.35.$$

40. An objective lens system as claimed in claim 39, wherein the following condition is satisfied:

$$0.6 < r1/f \leq 0.8869.$$

41. An objective lens system as claimed in claim 24 wherein the following condition is satisfied:

$$NA \geq 0.8$$

where

NA is the numerical aperture of the single lens.

42. An optical information recorder comprising: an optical pickup having the objective lens system having a construction of claim 24.

43. An objective lens system as claimed in claim 24, wherein the following condition is satisfied:

$$0.6 < r1/f2 < 0.95$$

where r1 is the radius of curvature of the first surface; and f is the focal length of the first lens.

44. An objective lens system as claimed in claim 24, wherein the following condition is satisfied:

$$-300 < r2/f < -1.5$$

where r2 is the radius of curvature of the second surface; and f is the focal length of the single lens.

* * * * *

UNITED STATES PATENT AND TRADEMARK OFFICE
CERTIFICATE OF CORRECTION

PATENT NO. : 6,922,289 B2
DATED : July 26, 2005
INVENTOR(S) : Junji Hashimura et al.

It is certified that error appears in the above-identified patent and that said Letters Patent is hereby corrected as shown below:

Column 32,
Line 45, delete "-0.45 < rl/r2 <-0.1803" and insert -- -0.45 < rl/r2 $\leq$-0.1803 --.

Column 33,
Line 36, delete "0.35 < d/f < 1.4" and insert -- 1.05 < d/f < 1.4 --.

Column 34,
Line 10, delete "conditions is" and insert -- condition is --.
Line 12, delete "0.3<(r2+r1)/(r2•rl) <0.525." and insert -- 0.3<(r2+rl)/(r2•rl) $\leq$0.525. --.
Line 16, delete "NA<0.8" and insert -- NA$\geq$0.8 --.
Line 23, delete "claim 9, the" and insert -- claim 9, wherein the --.

Column 35,
Lines 20-21, delete "-4.6603<r2/f< -1.5
            0.2284<WD/f<0.5" and insert
-- -4.6603$\leq$r2/f< -1.5
    0.2284$\leq$WD/f<0.5 --.
Line 25, delete "NA<0.8" and insert -- NA$\geq$0.8 --.

Column 36,
Line 40, delete "0.6$\leq$r1/f<0.8869." and insert -- 0.6<rl/f$\leq$0.8869. --.

Column 37,
Line 24, delete "NA>0.8" and insert -- NA$\geq$0.8 --.

UNITED STATES PATENT AND TRADEMARK OFFICE
CERTIFICATE OF CORRECTION

PATENT NO. : 6,922,289 B2
DATED : July 26, 2005
INVENTOR(S) : Junji Hashimura et al.

It is certified that error appears in the above-identified patent and that said Letters Patent is hereby corrected as shown below:

Column 40,
Line 10, delete "$0.6 < rl/f \leqq )0.8869.$" and insert -- $0.6 < rl/f \leqq 0.8869.$ --.
Line 21, "claim 24" and insert -- claim 24, --.

Signed and Sealed this

Eighteenth Day of October, 2005

JON W. DUDAS
*Director of the United States Patent and Trademark Office*